United States Patent
Fukuta et al.

(10) Patent No.: US 8,993,190 B2
(45) Date of Patent: Mar. 31, 2015

(54) FUEL CELL UNIT AND FUEL CELL

(75) Inventors: Masahiro Fukuta, Tochigi-ken (JP);
Yoshihiro Nakanishi, Utsunomiya (JP);
Kentaro Ishida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/449,427

(22) Filed: Apr. 18, 2012

(65) Prior Publication Data

US 2012/0270131 A1 Oct. 25, 2012

(30) Foreign Application Priority Data

Apr. 20, 2011 (JP) ................................ 2011-094344
Apr. 20, 2011 (JP) ................................ 2011-094346
Apr. 20, 2011 (JP) ................................ 2011-094364

(51) Int. Cl.
*H01M 8/24* (2006.01)
*H01M 8/04* (2006.01)
*H01M 8/10* (2006.01)
*H01M 8/02* (2006.01)

(52) U.S. Cl.
CPC .............. *H01M 8/0256* (2013.01); *Y02E 60/50* (2013.01); *H01M 8/248* (2013.01); *H01M 8/026* (2013.01); *H01M 8/0273* (2013.01); *H01M 8/0284* (2013.01); *H01M 8/0297* (2013.01); *H01M 8/04007* (2013.01); *H01M 8/04089* (2013.01); *H01M 2008/1095* (2013.01)
USPC ............................ 429/463; 429/454; 429/482

(58) Field of Classification Search
CPC ... H01M 8/02; H01M 8/0271; H01M 8/0273; H01M 8/248; H01M 8/0256; H01M 8/0297; H01M 8/026; H01M 2008/1095; H01M 8/0284; H01M 8/04007; H01M 8/04089
USPC .................................................. 429/400–535
See application file for complete search history.

(56) References Cited

U.S. PATENT DOCUMENTS

| 7,803,492 | B2 | 9/2010 | Sakano et al. | |
|---|---|---|---|---|
| 2005/0095492 | A1* | 5/2005 | Frank et al. | 429/35 |
| 2006/0088752 | A1* | 4/2006 | Sakano et al. | 429/34 |

(Continued)

FOREIGN PATENT DOCUMENTS

| JP | 08-222237 A | 8/1996 |
|---|---|---|
| JP | 09-134734 A | 5/1997 |

(Continued)

OTHER PUBLICATIONS

Machine English Translation of JP 2008-071506 to Tatsui et al.*

(Continued)

*Primary Examiner* — Milton I Cano
*Assistant Examiner* — Michael Dignan
(74) *Attorney, Agent, or Firm* — Carrier Blackman & Associates, P.C.; William D. Blackman; Joseph P. Carrier

(57) ABSTRACT

A fuel cell unit of a fuel cell contains a first membrane electrode assembly having a frame portion on an outer circumference thereof, a first separator, a second membrane electrode assembly having a frame portion on an outer circumference thereof, a second separator, and a third separator. A plurality of resin pins are formed integrally on the frame portion of the first membrane electrode assembly. The resin pins are integrally inserted into holes in the first separator, holes in the second membrane electrode assembly, holes in the second separator, and holes in the third separator.

16 Claims, 27 Drawing Sheets

(56) References Cited

U.S. PATENT DOCUMENTS

2009/0004539 A1* 1/2009 Ishikawa et al. ............... 429/35
2010/0297525 A1* 11/2010 Fukuta et al. ............... 429/483

FOREIGN PATENT DOCUMENTS

| JP | 2000-012067 A | 1/2000 |
| JP | 2002-367662 A | 12/2002 |
| JP | 2004-087311 A | 3/2004 |
| JP | 2006-147460 A | 6/2006 |
| JP | 2007-188693 A | 7/2007 |
| JP | 2008-071506 A | 3/2008 |
| JP | 2008-293896 A | 12/2008 |
| JP | 2009-009838 A | 1/2009 |
| JP | 4417224 B2 | 2/2010 |
| JP | 2010-140755 A | 6/2010 |
| JP | 2010-272313 A | 12/2010 |

OTHER PUBLICATIONS

Japanese Office Action dated Jun. 24, 2014 issued over the counterpart JP Patent Application 2011-094344 with the English translation of pertinent portions.

Japanese Office Action dated Jun. 24, 2014 issued over the counterpart JP Patent Application 2011-094346 with the English translation of pertinent portions.

Japanese Office Action dated Jun. 24, 2014 issued over the counterpart JP Patent Application 2011-094364 with the English translation of pertinent portions.

* cited by examiner

FUEL CELL UNIT AND FUEL CELL

CROSS-REFERENCE TO RELATED APPLICATION

This application is based upon and claims the benefit of priority from Japanese Patent Applications No. 2011-094344 filed on Apr. 20, 2011, No. 2011-094346 filed on Apr. 20, 2011 and No. 2011-094364 filed on Apr. 20, 2011, of which the contents are incorporated herein by reference.

BACKGROUND OF THE INVENTION

1. Field of the Invention

The present invention relates to a fuel cell unit formed by stacking a rectangular membrane electrode assembly and a rectangular separator together, the membrane electrode assembly containing a pair of electrodes and an electrolyte membrane interposed between the electrodes. The membrane electrode assembly also includes a picture-frame-like resin frame formed on an outer circumference thereof. Further, the present invention relates to a fuel cell formed by stacking a plurality of such fuel cell units.

2. Description of the Related Art

For example, in a solid polymer electrolyte fuel cell, an electrolyte membrane composed of a polymer ion exchange membrane is interposed between an anode and a cathode to form a membrane electrode assembly (MEA). The membrane electrode assembly is sandwiched between separators to form a fuel cell unit. In use, generally, a predetermined number of such fuel cell units are stacked together to form a fuel cell stack, which is mounted in a vehicle, for example.

In general, several tens or hundreds of the fuel cell units are stacked to obtain the fuel cell stack. In the stacking process, it is necessary to accurately position constituent members of the fuel cell unit to each other and the fuel cell units to each other. For example, a solid polymer electrolyte membrane fuel cell disclosed in Japanese Laid-Open Patent Publication No. 2000-012067 is known.

As shown in FIG. 27, this fuel cell includes a unit cell 3 formed by sandwiching a cell (electrolyte-electrode assembly) 1 between separators 2A, 2B, the cell 1 including an electrolyte layer 1A, and a fuel electrode 1B and an oxidant electrode 1C which sandwich the electrolyte layer 1A therebetween. A holding pin insert hole 4a, a retaining ring insert hole 4b, and a hole 5 are coaxially formed in the separator 2A, the separator 2B, and the electrolyte layer 1A, respectively.

A holding pin 6 is inserted into the holding pin insert hole 4a, the hole 5 and the retaining ring insert hole 4b. A retaining ring 7 is attached to a distal end of the holding pin 6, whereby the unit cell 3 is integrally retained. A pin-distal-end insert hole 8 is formed in a rear end portion of the holding pin 6, and the distal end of the adjacent holding pin 6 is inserted thereinto in the process of stacking a plurality of the unit cells 3.

Meanwhile, in the case where a metal separator obtained by forming a thin metal plate into a corrugated shape is used as a separator of the fuel cell, when grooves for a fuel gas flow field are formed on one surface of the anode-side metal separator, ridges corresponding to the reverse side of the grooves are formed on the other surface thereof. Furthermore, when grooves for an oxygen-containing gas flow field are formed on one surface of the cathode-side metal separator, ridges corresponding to the reverse side of the grooves are formed on the other surface thereof.

For example, Japanese Laid-Open Patent Publication No. 08-222237 discloses a fuel cell stack, which is formed by stacking a plurality of cells (fuel cell units) containing a solid electrolyte and electrodes disposed on opposite sides of the solid electrolyte. In the fuel cell stack, a fuel cell separator is interposed between the adjacent cells. On one surface of the separator, fuel gas flow grooves for supplying a fuel gas to one of the adjacent cells are formed, and on the other surface, oxygen-containing gas flow grooves for supplying an oxygen-containing gas to the other of the adjacent cells are formed.

SUMMARY OF THE INVENTION

In the above unit cell 3, the holding pin insert hole 4a and the retaining ring insert hole 4b having stepped shapes are formed in the separators 2A and 2B respectively. Therefore, the unit cell 3 requires remarkably complicated drilling process and an increased number of components, thereby resulting in high production cost.

Furthermore, although the holding pin 6 and the retaining ring 7 are used as fastening members, the unit cell 3 cannot reliably withstand an external impact load in some cases. Therefore, when a shear load is applied to the unit cell 3, the cell (electrolyte electrode assembly) 1 and the separators 2A and 2B may be displaced in the shear direction, resulting in deteriorated sealing performance.

In addition, in the process of stacking a plurality of the unit cells 3, it is necessary to insert the distal end of each holding pin 6 into the pin-distal-end insert hole 8 of another holding pin 6 adjacent in the stacking direction. Therefore, the holding pins 6 interfere with each other in the stacking direction, and the dimension of the fuel cell cannot be reduced in the stacking direction.

The fuel cell stack may have a so-called skip cooling structure where a coolant flow field having coolant flow grooves is formed between fuel unit cells for a predetermined number of fuel unit cells. If the above fuel cell separator or the like according to the related art is used in the fuel cell stack having such a skip cooling structure, it is necessary to set flow phases of the coolant flow fields of the adjacent separators such that the flow phases are reverse to each other in order to form the coolant flow field having corrugated flow grooves in planar view between the adjacent fuel cell units.

Thus, first and second fuel cell units having different flow phases are prepared and alternately stacked to obtain the fuel cell stack. However, for example, in a case where each fuel cell unit has two membrane electrode assemblies, three metal separators are used in each fuel cell unit. Consequently, six metal separators having different shapes must be produced, and thus a great number of dies are required uneconomically.

A general object of the present invention is to provide a fuel cell unit which, with a simple and economical structure, can be easily positioned for improved assembly workability, and which is capable of reliably withstanding an impact load thereby to secure excellent sealing and power generation performances.

Another object of the present invention is to provide a fuel cell which, with a simple and economical structure, can reliably retain fuel cell units in accurate positions and can be miniaturized in the stacking direction.

A further object of the present invention is to provide a fuel cell that can use common separators.

The present invention relates to a fuel cell unit formed by stacking a rectangular membrane electrode assembly and a rectangular separator together, the membrane electrode assembly comprising a pair of electrodes and an electrolyte membrane interposed between the electrodes, a picture-frame-like resin frame being formed on an outer circumference of the membrane electrode assembly.

In this fuel cell unit, at least one membrane electrode assembly has a plurality of fastening members on the opposite long sides thereof, and the other component including the separator has holes into which the fastening members are inserted.

The fastening members are fitted into the inner circumferential surfaces of the holes with no gap therebetween, and the at least one membrane electrode assembly and the other component are integrated together.

In the fuel cell unit of the present invention, a plurality of the fastening members are formed on each of the long sides facing each other in the at least one membrane electrode assembly. Each fastening member is fitted integrally into each hole formed in the other component without any gap between the inner surface of each hole and each fastening member. Therefore, when an impact load is applied to the long side, the membrane electrode assembly and the separator can reliably withstand the impact load. Thus, the components are not displaced with respect to each other in the shear direction, whereby desirable sealing and power generation performances can be secured.

Furthermore, the fuel cell unit does not require separate dedicated fastening members, whereby the number of components can be advantageously reduced thereby to lower the facility cost. Thus, with a simple and economical structure, the fuel cell unit containing the membrane electrode assembly and the separator and can be reliably positioned, retained, and assembled with effectively improved workability.

The present invention also relates to a fuel cell formed by stacking a plurality of fuel cell units, the fuel cell units each formed by stacking a rectangular membrane electrode assembly and a rectangular separator together, the membrane electrode assembly comprising a pair of electrodes and an electrolyte membrane interposed between the electrodes, a picture-frame-like resin frame being formed on an outer circumference of the membrane electrode assembly.

In the fuel cell unit of this fuel cell, the picture-frame-like resin frame has a plurality of fastening members on the opposite long sides, and the fuel cell unit is integrally retained by the fastening members. The fastening members of the fuel cell units adjacent to each other are not overlapped with each other in the stacking direction of the fuel cell units.

In the fuel cell of the present invention, the fuel cell unit is integrally retained by the fastening members, and the fastening members of the fuel cell units adjacent to each other are not overlapped with each other in the stacking direction. Therefore, the fuel cell units can be reliably stacked such that the fastening members do not interfere with each other in the stacking direction. Thus, with such a simple and economical structure, the fuel cell units are reliably positioned and retained, and the entire fuel cell can be miniaturized in the stacking direction.

The present invention further relates to another fuel cell formed by stacking a plurality of fuel cell units, the fuel cell units each formed by stacking a rectangular membrane electrode assembly and a rectangular separator together, the membrane electrode assembly comprising a pair of electrodes and an electrolyte membrane interposed the electrodes, a picture-frame-like resin frame being formed on an outer circumference of the membrane electrode assembly.

In this fuel cell, the fuel cell units are stacked such that one of the adjacent fuel cell units is rotated 180° about an axis perpendicular to the electrode surface with respect to the other of the adjacent fuel cell units. The fuel cell unit has a plurality of fastening members on the opposite long sides thereof, and the fuel cell unit is integrally retained. When the fuel cell unit is rotated 180° about the axis, the post-rotation positions of the fastening members on one long side are located between the pre-rotation positions of the fastening members on the other long side.

In the fuel cell of the present invention, the fuel cell units are stacked such that each fuel cell unit is rotated 180° with respect to the adjacent fuel cell unit. Therefore, the separators in the fuel cell units can have the same shape. This is because the flow phase of the separator in each fuel cell unit is opposite to that in the adjacent fuel cell unit due to the rotation. Thus, a common separator can be used in the fuel cell units, whereby the number of components can be advantageously reduced to lower the fuel cell production cost.

Furthermore, the fuel cell unit is integrally retained by a plurality of the fastening members on the long sides. The positions of the fastening members on one long side are substantially shifted by half pitch from the positions of the fastening members on the other long side in the longitudinal direction. Therefore, the separator can be readily and accurately attached in the desired state to each fuel cell unit, whereby the wrong assembly of the separator can be minimized. Thus, the fuel cell can have such a simple and economical structure that the fuel cell units are reliably positioned and retained.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
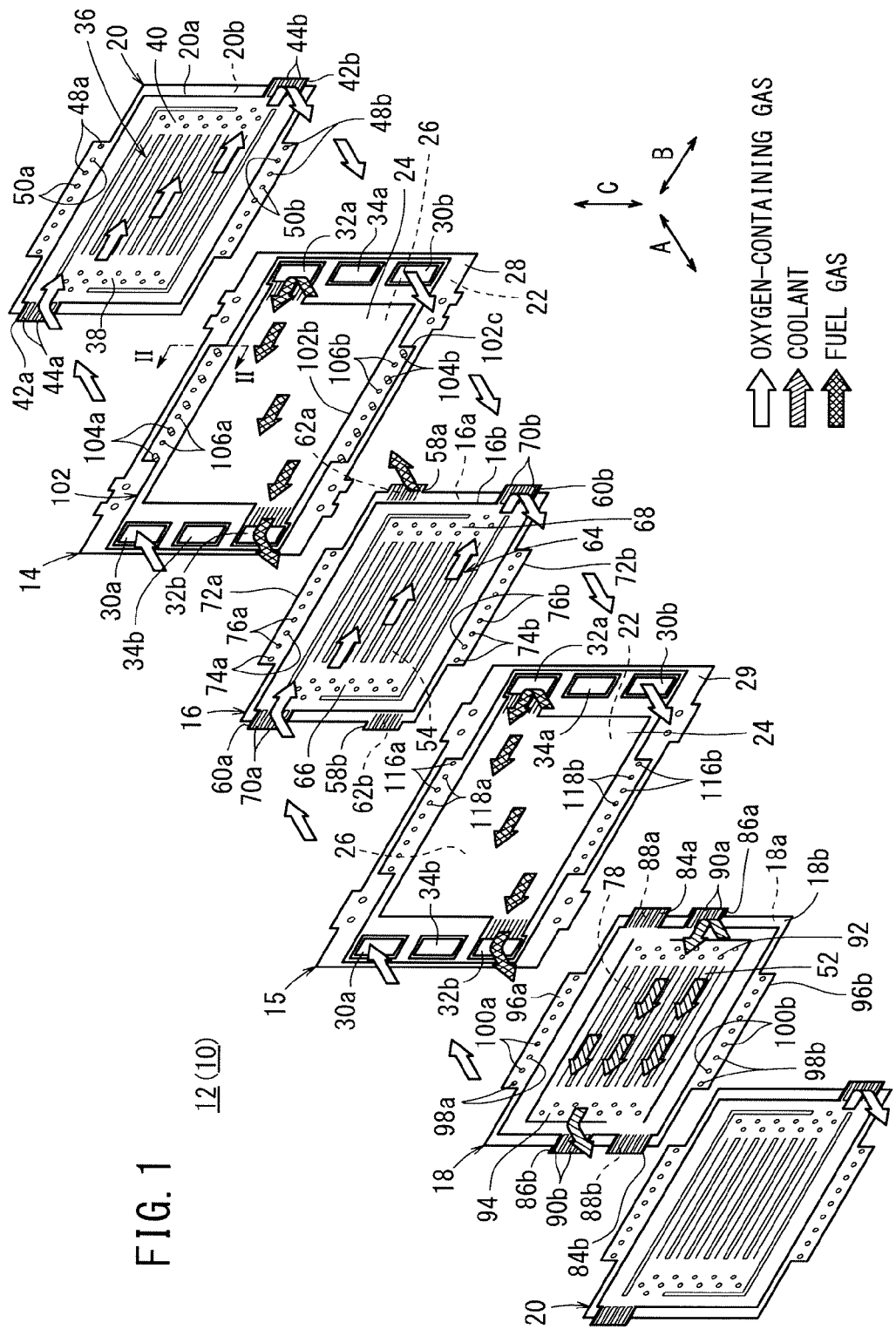
FIG. 1 is an exploded perspective view of main components of a fuel cell unit according to a first embodiment of the present invention.

As shown in FIG. 1, a fuel cell 10 has a fuel cell unit 12 according to a first embodiment of the present invention. In the fuel cell 10, a plurality of the fuel cell units 12 are stacked in the horizontal direction (a direction indicated by the arrow A) or the gravitational direction (a direction indicated by the arrow C) to form a fuel cell stack.

In the fuel cell unit 12, a first membrane electrode assembly (MEA) 14, a first separator 16, a second membrane electrode assembly (MEA) 15, a second separator 18, and a third separator 20 are stacked in this order. The first membrane electrode assembly 14, the first separator 16, the second membrane electrode assembly 15, the second separator 18, and the third separator 20 each have a rectangular shape such as a horizontally long shape.

For example, the first separator 16, the second separator 18, and the third separator 20 are composed of a steel plate, a stainless steel plate, an aluminum plate, a plated steel plate, or a metal plate obtained by subjecting a metal surface thereof to an anticorrosion treatment. The first separator 16, the second separator 18, and the third separator 20 are formed by pressing a thin metal plate into a corrugated plate so that the separators 16, 18, 20 have ridges and grooves in cross section.

The outer circumferential portions of the second separator 18 and the third separator 20 are joined to each other by welding, adhesive bonding, brazing, crimping, etc., whereby a coolant flow field 52 (to be described later) is formed and airtightly sealed therebetween. Incidentally, a carbon separator or the like, instead of the metal separator, may be used as the first separator 16, the second separator 18, or the third separator 20.

Figure 2:
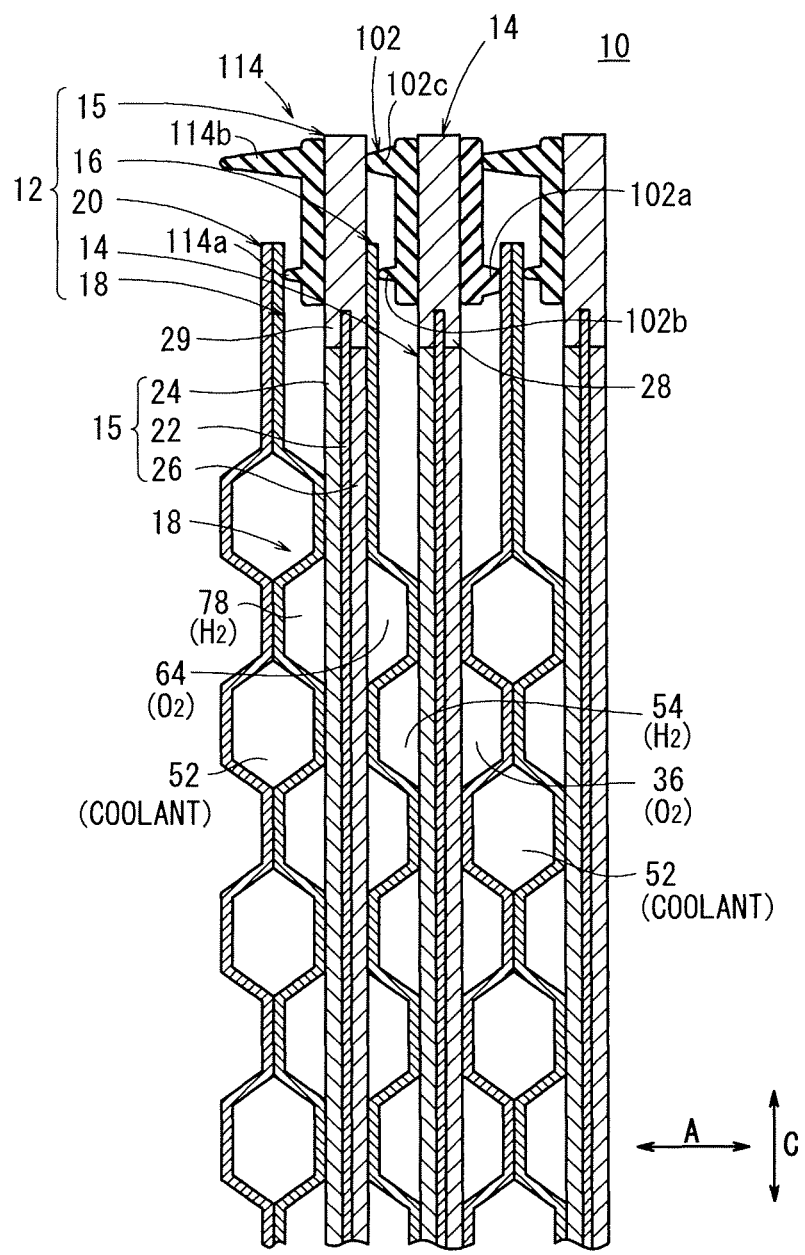
FIG. 2 is a cross-sectional view taken along the line II-II of FIG. 1.

For example, the first membrane electrode assembly 14 and the second membrane electrode assembly 15 each contain a solid polymer electrolyte membrane 22 obtained by impregnating a thin perfluorosulfonic acid membrane with water, and further contains an anode 24 and a cathode 26 sandwiching the solid polymer electrolyte membrane 22 therebetween (see FIG. 2).

The anode 24 and the cathode 26 each have a gas diffusion layer (not shown) composed of a carbon paper or the like and an electrode catalyst layer (not shown). The electrode catalyst layer is formed by uniformly coating a surface of the gas diffusion layer with porous carbon particles carrying a platinum alloy on the surface. The electrode catalyst layers are formed on both sides of the solid polymer electrolyte membrane 22, respectively.

The solid polymer electrolyte membrane 22 has a surface area larger than those of the anode 24 and the cathode 26. Resin frame portions (picture-frame-like resin frames) 28 and 29 are integrally formed on the outer circumferential ends of the solid polymer electrolyte membranes 22 by injection molding, etc. Examples of the resins include commodity plastics, engineering plastics, super engineering plastics, etc.

As shown in FIG. 1, on one end of each frame portion 28, 29 in the direction indicated by the arrow B, an oxygen-containing gas supply passage 30a for supplying an oxidant gas such as an oxygen-containing gas, a coolant discharge passage 34b for discharging a coolant, and a fuel gas discharge passage 32b for discharging a fuel gas such as a hydrogen-containing gas are arranged in a direction indicated by the arrow C (the vertical direction). The oxygen-containing gas supply passage 30a, the coolant discharge passage 34b, and the fuel gas discharge passage 32b extend through the frame portions 28, 29 in the direction indicated by the arrow A.

On the other end of each frame portion 28, 29 in the direction indicated by the arrow B, a fuel gas supply passage 32a for supplying the fuel gas, a coolant supply passage 34a for supplying the coolant, and an oxygen-containing gas discharge passage 30b for discharging the oxygen-containing gas are arranged in the direction indicated by the arrow C. The fuel gas supply passage 32a, the coolant supply passage 34a, and the oxygen-containing gas discharge passage 30b extend through the frame portions 28, 29 in the direction indicated by the arrow A.

The outer circumference of the first separator 16, the second separator 18, and the third separator 20 are located inside the planar arrangement of the oxygen-containing gas supply passage 30a, the coolant supply passage 34a, the fuel gas discharge passage 32b, the fuel gas supply passage 32a, the coolant discharge passage 34b, and the oxygen-containing gas discharge passage 30b.

Figure 3:
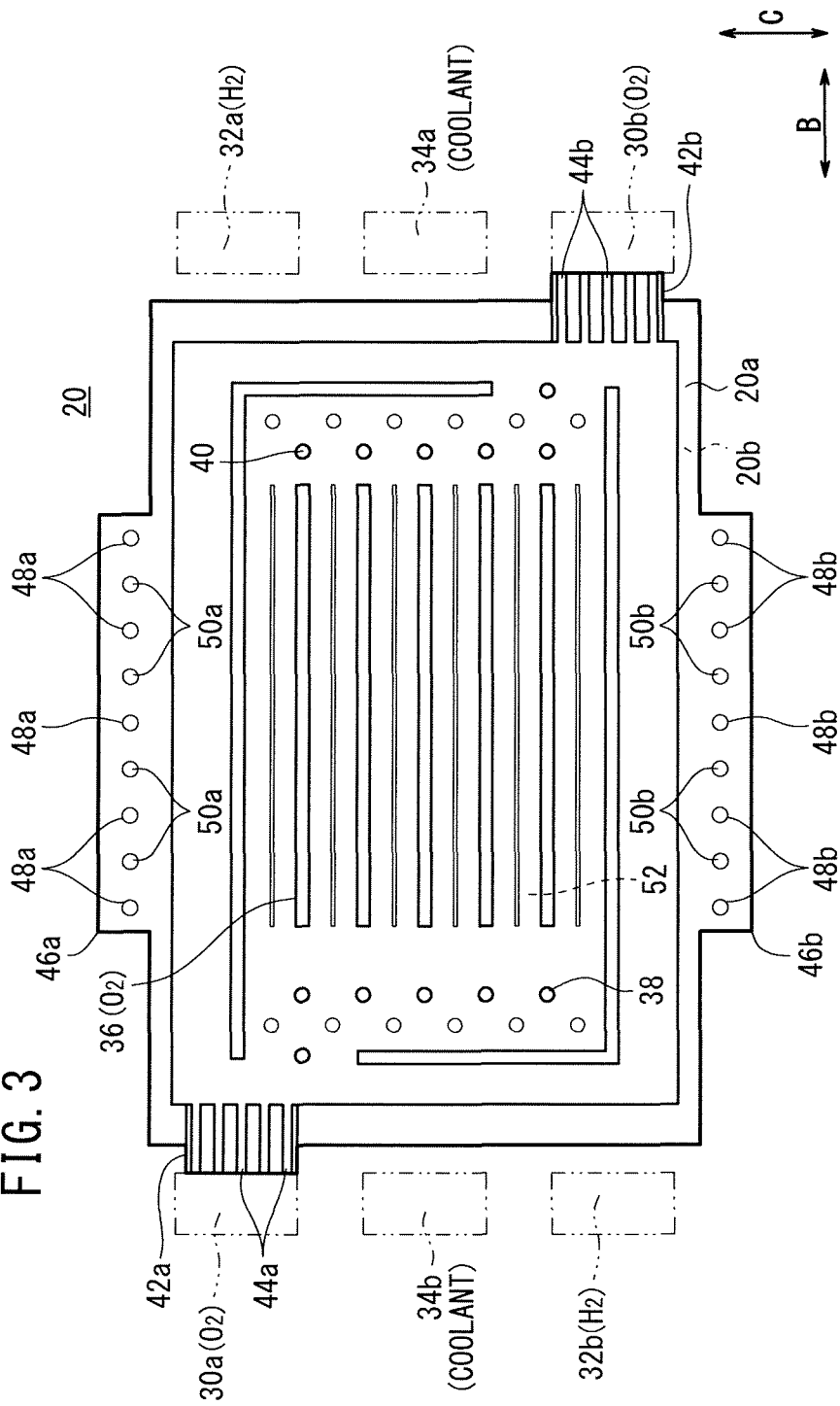
FIG. 3 is a front elevational view of a third separator of the fuel cell unit of FIG. 1.

As shown in FIGS. 1 and 3, a first oxygen-containing gas flow field 36 for connecting the oxygen-containing gas supply passage 30a with the oxygen-containing gas discharge passage 30b is formed on a surface 20a of the third separator 20 facing the first membrane electrode assembly 14. The first oxygen-containing gas flow field 36 has a plurality of flow grooves extending in the direction of the arrow B. The flow grooves are formed by corrugating the third separator 20 so as to have ridges and grooves. An inlet buffer 38 and an outlet buffer 40 having a plurality of bosses are formed in the vicinity of the inlet and outlet of the first oxygen-containing gas flow field 36, respectively.

A projection 42a protrudes from an end of the third separator 20 in the direction of the arrow B toward the oxygen-containing gas supply passage 30a, whereas a projection 42b protrudes from the other end thereof in the arrow B direction toward the oxygen-containing gas discharge passage 30b. The projection 42a is formed into a corrugated shape so as to have inlet channels 44a for connecting the oxygen-containing gas supply passage 30a to the first oxygen-containing gas flow field 36, while the projection 42b is formed into a corrugated shape so as to have outlet channels 44b for connecting the oxygen-containing gas discharge passage 30b to the first oxygen-containing gas flow field 36.

Projections 46a and 46b protrude from opposite ends of the third separator 20 in the directions indicated by the arrow C outwardly (arrow C directions), the projections 46a, 46b having a long shape extending in the arrow B direction (see FIG.

3). For example, in the projection 46a, a plurality of holes 48a and a plurality of rebuilt pin insert holes 50a are alternately arranged as through holes in the arrow B direction. Preferably, the hole 48a and the rebuilt pin insert hole 50a have the same diameter, but may have different diameters. The same applies to holes to be described later.

It should be noted that the combination of two holes 48a and one rebuilt pin insert hole 50a may be arranged. Holes to be described later may be arranged in this manner. Similarly, for example, in the projection 46b, a plurality of holes 48b and a plurality of rebuilt pin insert holes 50b are alternately arranged as through holes in the arrow B direction. The holes 48a, 48b are positioned respectively in the opposite long sides (i.e., projections 46a, 46b) such that each hole 48a faces each hole 48b. Similarly, the rebuilt pin insert holes 50a, 50b are positioned respectively in the opposite long sides (i.e., projection 46a, 46b) such that each rebuilt pin insert hole 50a faces each rebuilt pin insert hole 50b.

A coolant flow field 52 for connecting the coolant supply passage 34a to the coolant discharge passage 34b is formed on a surface 20b of the third separator 20. The coolant flow field 52 has a shape corresponding to the reverse of the first oxygen-containing gas flow field 36.

Figure 4:
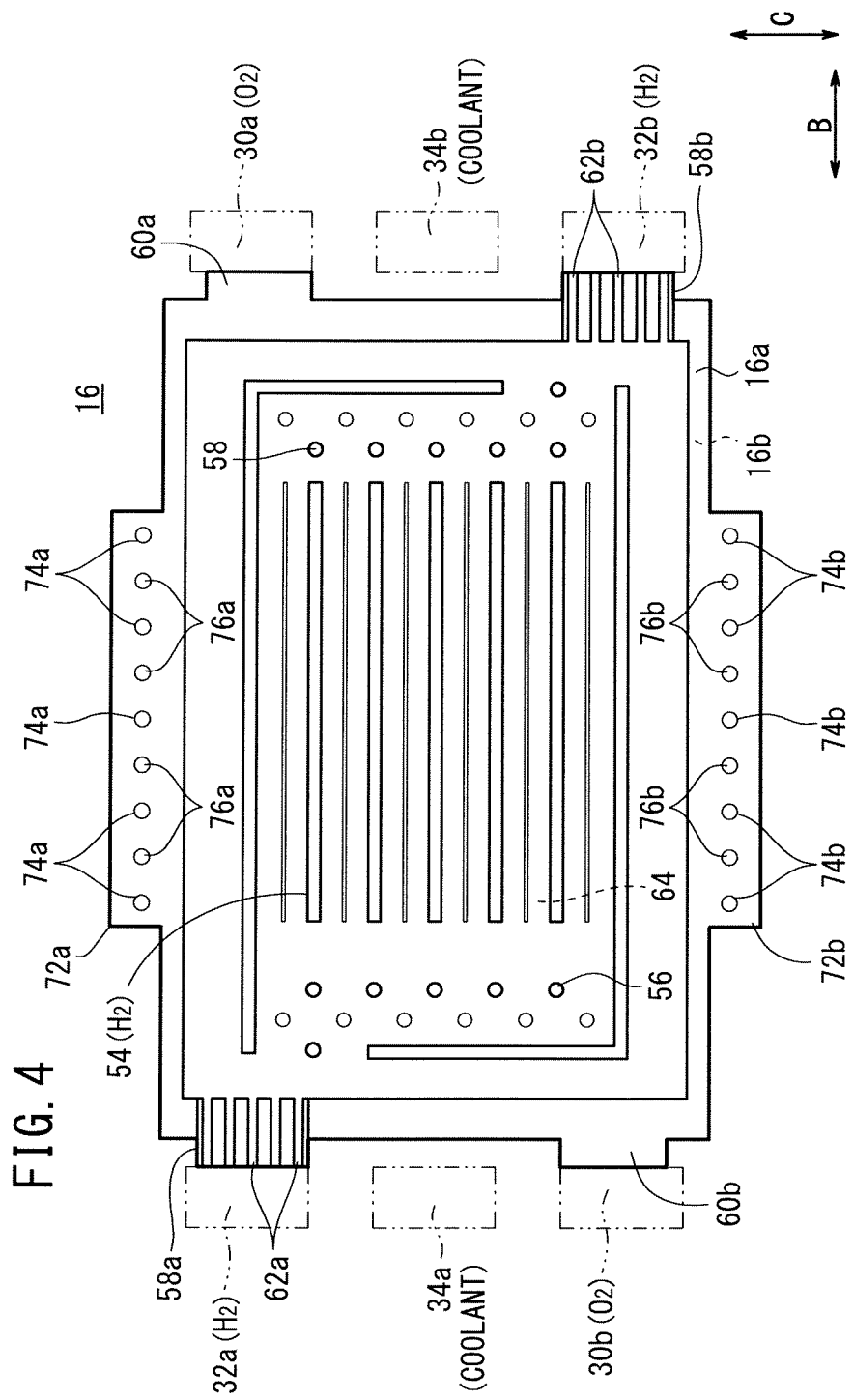
FIG. 4 is a front elevational view of a first separator of the fuel cell unit of FIG. 1.

As shown in FIG. 4, a first fuel gas flow field 54 for connecting the fuel gas supply passage 32a to the fuel gas discharge passage 32b is formed on a surface 16a of the first separator 16 facing the first membrane electrode assembly 14. The first fuel gas flow field 54 has a plurality of flow grooves extending in the arrow B direction. The flow grooves are formed by corrugating the first separator 16 so as to have ridges and grooves. An inlet buffer 56 and an outlet buffer 58 are formed in the vicinity of the inlet and outlet of the first fuel gas flow field 54, respectively.

Projections 58a and 58b are formed respectively at opposite ends of the first separator 16 in the arrow B direction, and the projections 58a, 58b protrude respectively toward the fuel gas supply passage 32a and the fuel gas discharge passage 32b. Projections 60a and 60b are formed respectively at opposite ends of the first separator 16 in the arrow B direction, and the projections 60a, 60b protrude respectively toward the oxygen-containing gas supply passage 30a and the oxygen-containing gas discharge passage 30b. On the surface 16a, the projection 58a is formed into a corrugated shape so as to have inlet channels 62a for connecting the fuel gas supply passage 32a to the first fuel gas flow field 54, while the projection 58b is formed into a corrugated shape so as to have outlet channels 62b for connecting the fuel gas discharge passage 32b to the first fuel gas flow field 54.

As shown in FIG. 1, a second oxygen-containing gas flow field 64 for connecting the oxygen-containing gas supply passage 30a with the oxygen-containing gas discharge passage 30b is formed on a surface 16b of the first separator 16 facing the second membrane electrode assembly 15. The second oxygen-containing gas flow field 64 has a plurality of flow grooves extending in the arrow B direction. The flow grooves are formed by corrugating the first separator 16 so as to have ridges and grooves. An inlet buffer 66 and an outlet buffer 68 are formed in the vicinity of the inlet and outlet of the second oxygen-containing gas flow field 64, respectively.

On the surface 16b, the projection 60a is formed into a corrugated shape so as to have inlet channels 70a for connecting the oxygen-containing gas supply passage 30a to the second oxygen-containing gas flow field 64, while the projection 60b is formed into a corrugated shape so as to have outlet channels 70b for connecting the oxygen-containing gas discharge passage 30b to the second oxygen-containing gas flow field 64.

Projections 72a and 72b protrude from opposite ends of the first separator 16 in the arrow C direction outwardly (arrow C directions), the projections 72a, 72b having a long shape extending in the arrow B direction. As shown in FIG. 4, for example, in the projection 72a, a plurality of holes 74a and a plurality of rebuilt pin insert holes 76a are alternately arranged as through holes in the arrow B direction. Similarly, for example, in the projection 72b, a plurality of holes 74b and a plurality of rebuilt pin insert holes 76b are alternately arranged as through holes in the arrow B direction. The holes 74a, 74b are positioned respectively in the opposite long sides (i.e., projections 72a, 72b) such that each hole 74a faces each hole 74b. Similarly, the rebuilt pin insert holes 76a, 76b are positioned respectively in the opposite long sides (i.e., projection 72a, 72b) such that each rebuilt pin insert hole 76a faces each rebuilt pin insert hole 76b.

Figure 5:
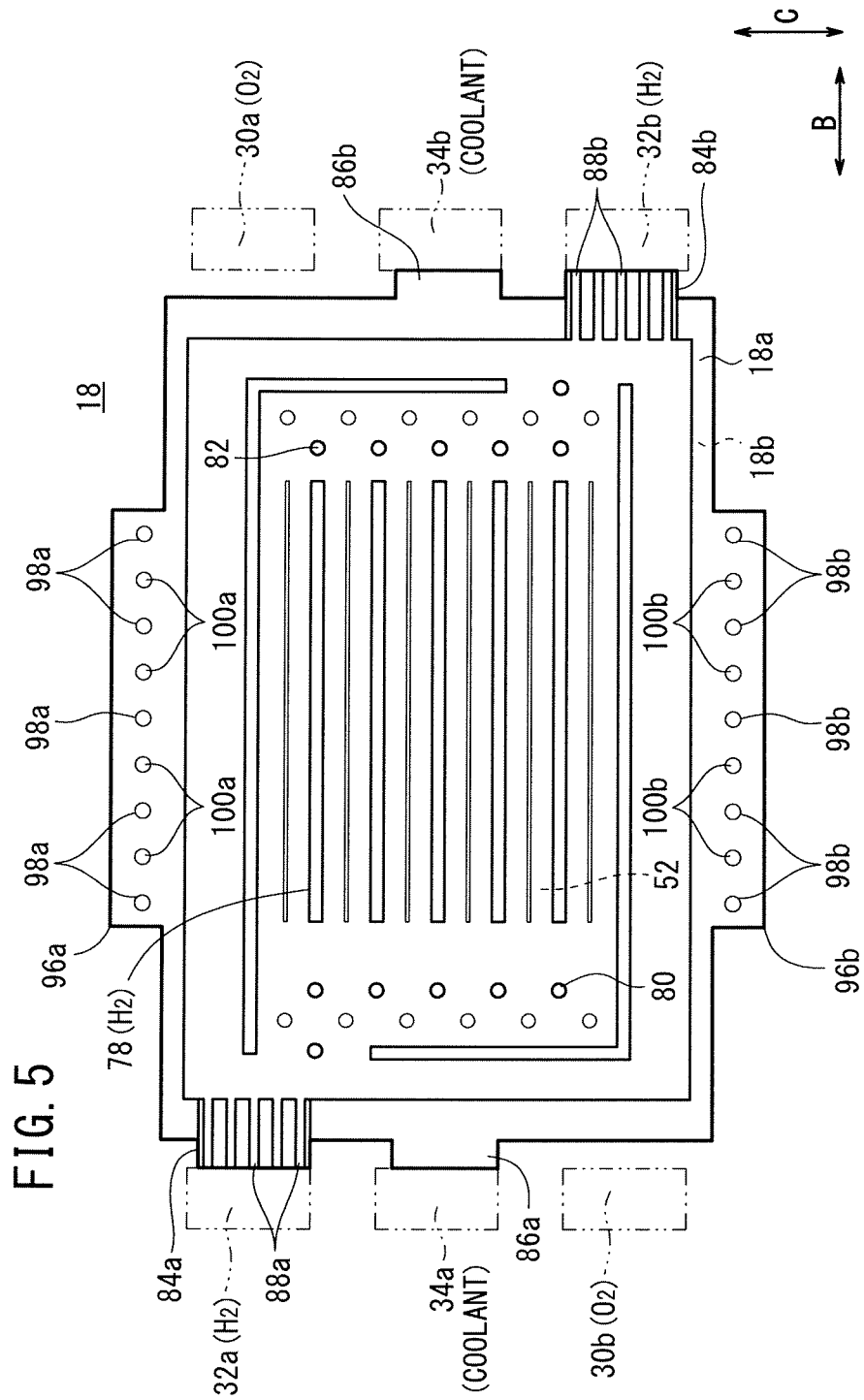
FIG. 5 is a front elevational view of a second separator of the fuel cell unit of FIG. 1.

As shown in FIG. 5, a second fuel gas flow field 78 for connecting the fuel gas supply passage 32a with the fuel gas discharge passage 32b is formed on a surface 18a of the second separator 18 facing the second membrane electrode assembly 15. The second fuel gas flow field 78 has a plurality of flow grooves extending in the arrow B direction. The flow grooves are formed by corrugating the second separator 18 so as to have ridges and grooves. An inlet buffer 80 and an outlet buffer 82 are formed in the vicinity of the inlet and outlet of the second fuel gas flow field 78, respectively.

Projections 84a and 84b are formed respectively at opposite ends of the second separator 18 in the arrow B direction, and the projections 84a, 84b protrude respectively toward the fuel gas supply passage 32a and the fuel gas discharge passage 32b. Projections 86a and 86b are formed respectively at opposite ends of the second separator 18 in the arrow B direction, and the projections 86a, 86b protrude respectively toward the coolant supply passage 34a and the coolant discharge passage 34b.

On the surface 18a, the projection 84a is formed into a corrugated shape so as to have inlet channels 88a for connecting the fuel gas supply passage 32a to the second fuel gas flow field 78, while the projection 84b is formed into a corrugated shape so as to have outlet channels 88b for connecting the fuel gas discharge passage 32b to the second fuel gas flow field 78.

As shown in FIG. 1, on a surface 18b, the projection 86a is formed into a corrugated shape so as to have inlet channels 90a for connecting the coolant supply passage 34a to the coolant flow field 52, while the projection 86b is formed into a corrugated shape so as to have outlet channels 90b for connecting the coolant discharge passage 34b to the coolant flow field 52.

The surface 18b has a shape corresponding to the reverse of the second fuel gas flow field 78 on the surface 18a. The surface 18b is laid on the surface 20b of the third separator 20 to form the coolant flow field 52. An inlet buffer 92 and an outlet buffer 94 are formed in the vicinity of the inlet and outlet of the coolant flow field 52, respectively.

As shown in FIGS. 1 and 5, projections 96a and 96b protrude respectively from opposite ends of the second separator 18 in the arrow C direction outwardly (arrow C directions), the projections 96a, 96b having a long shape extending in the arrow B direction. For example, in the projection 96a, a plurality of holes 98a and a plurality of rebuilt pin insert holes 100a are alternately arranged as through holes in the arrow B direction. Similarly, for example, in the projection 96b, a plurality of holes 98b and a plurality of rebuilt pin insert holes 100b are alternately arranged as through holes in the arrow B direction. The holes 98a, 98b are positioned respectively in the opposite long sides (i.e., projections 96a, 96b) such that each hole 98a faces each hole 98b. Similarly, the rebuilt pin insert holes 100a, 100b are positioned respectively in the opposite long sides (i.e., projection 96a, 96b) such that each rebuilt pin insert hole 100a faces each rebuilt pin insert hole 100b.

As shown in FIG. 1, a first sealing member 102 is integrally formed with the frame portion 28 of the first membrane electrode assembly 14. The first sealing member 102 is made of a sealant material, a cushion material, or a packing material such as EPDM rubber (Ethylene Propylene Diene Monomer), NBR (Nitrile Rubber), fluoro rubber, silicone rubber, fluoro silicone rubber, butyl rubber, natural rubber, styrene rubber, chloroprene rubber, or acrylic rubber. In addition, a second sealing member 114 to be described later may be composed of the same material.

As shown in FIG. 2, the first sealing member 102 has a first sealing part 102a on a surface thereof facing the third separator 20. The first sealing part 102a is provided circumferentially in contact with the outer circumferential end of the third separator 20.

Figure 6:
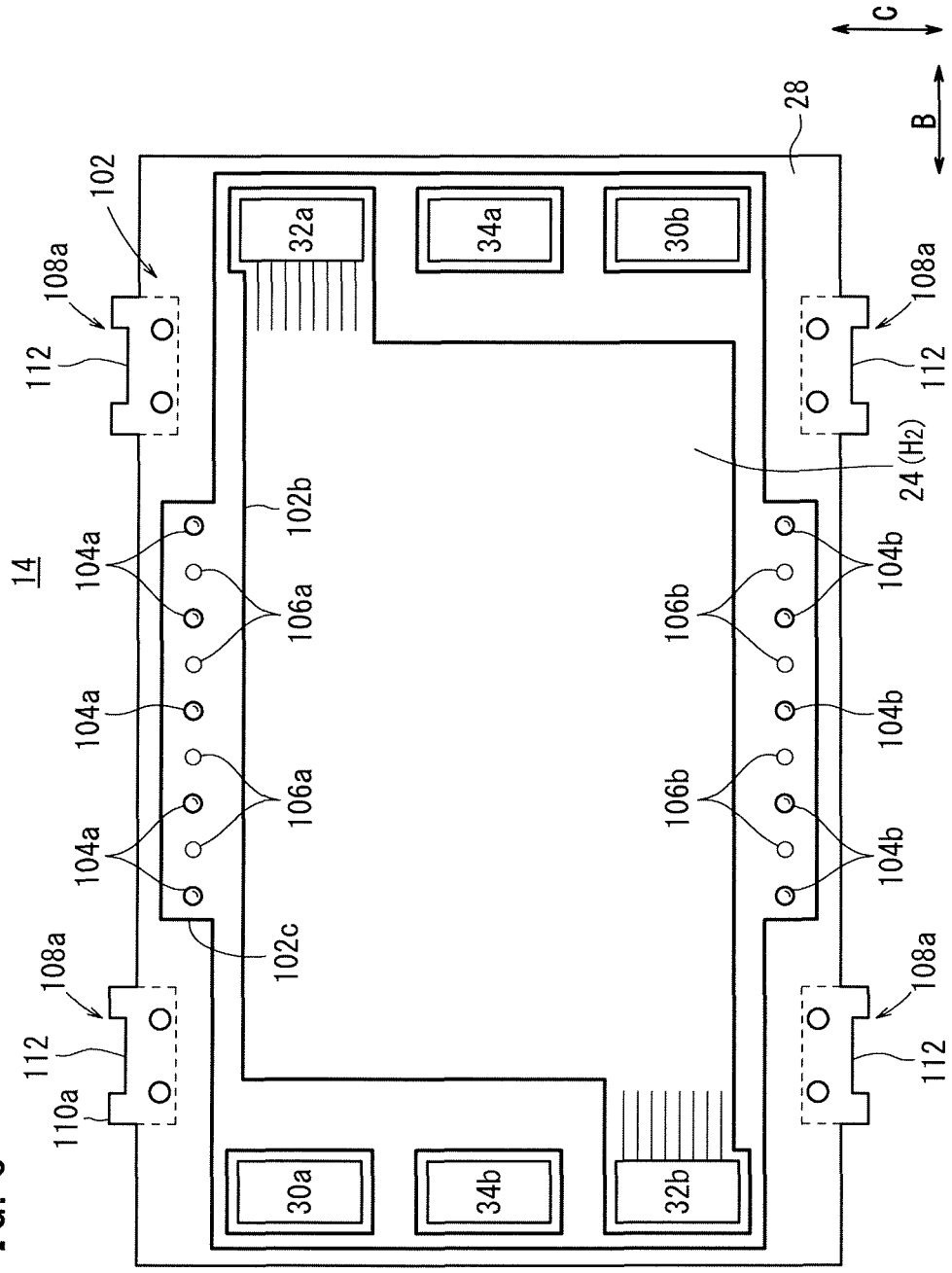
FIG. 6 is a front elevational view of a first membrane electrode assembly of the fuel cell unit of FIG. 1.

As shown in FIGS. 2 and 6, the first sealing member 102 further has a second sealing part 102b and a third sealing part 102c on a surface thereof facing the first separator 16. The second sealing part 102b is provided circumferentially in contact with the outer circumferential end of the first separator 16. The third sealing part 102c is in contact with the frame portion 29 of the adjacent second membrane electrode assembly 15 outside the outer circumference of the first separator 16.

As shown in FIG. 6, in each end portion of the first membrane electrode assembly 14 in the arrow C direction, the third sealing part 102c detours outwardly over a relatively wide region in the arrow B direction. As in a front elevational view of FIG. 6, a plurality of fastening members of resin pins (resin projections) 104a and a plurality of rebuilt pin insert holes 106a are, for example, alternately formed between the upper detouring portion of the third sealing part 102c and the second sealing part 102b, and a plurality of fastening members of resin pins (resin projections) 104b and a plurality of rebuilt pin insert holes 106b are, for example, alternately formed between the lower detouring portion of the third sealing part 102c and the second sealing part 102b. The resin pins 104a, 104b are positioned respectively in the opposite long sides such that each resin pin 104a faces each resin pin 104b. Similarly, the rebuilt pin insert holes 106a, 106b are positioned respectively in the opposite long sides such that each rebuilt pin insert hole 106a faces each rebuilt pin insert hole 106b.

When the resin pins 104a and 104b are formed only on the long sides of the first membrane electrode assembly 14, the number of the resin pins 104a and 104b can be increased, and spaces for arranging the oxygen-containing gas supply passage 30a, the oxygen-containing gas discharge passage 30b, the fuel gas supply passage 32a, the fuel gas discharge passage 32b, the coolant supply passage 34a, and the coolant discharge passage 34b can be secured on the short sides.

The resin pins 104a and 104b are positioned between the detouring portions of the third sealing part 102c and the second sealing part 102b, thus between the double sealing parts (capable of sealing portions around the rebuilt pin insert holes 106a and 106b). The resin pins 104a and 104b are integrally formed with the frame portion 28 and protrude toward the second membrane electrode assembly 15 (see FIG. 1).

Resin guiding members 108a are integrally formed with the frame portion 28 at both ends of each long side of the first membrane electrode assembly 14. The resin guiding member 108a may be formed separately from the frame portion 28 and then integrated with the frame portion 28. The resin guiding member 108a includes a concave recess 112 extending inward from an outer end 110a thereof.

Figure 7:
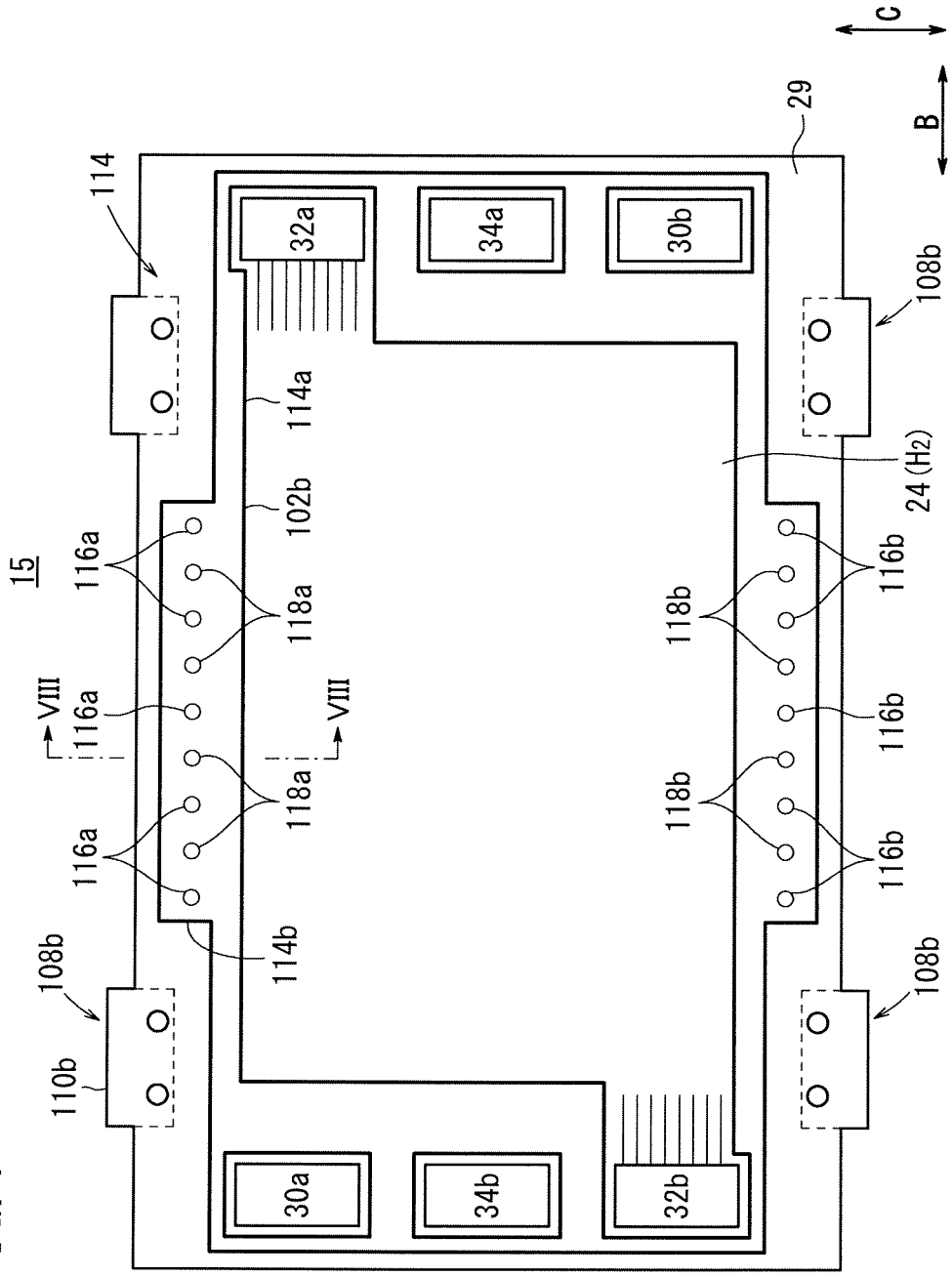
FIG. 7 is a front elevational view of a second membrane electrode assembly of the fuel cell unit of FIG. 1.

As shown in FIGS. 2 and 7, the second sealing member 114 is integrally formed with the frame portion 29 of the second membrane electrode assembly 15. The second sealing member 114 has a first sealing part 114a and a second sealing part 114b on a surface thereof facing the second separator 18. The first sealing part 114a is provided circumferentially in contact with the outer circumferential end of the second separator 18, and the second sealing part 114b is in contact with the frame portion 28 of the adjacent first membrane electrode assembly 14 outside the outer circumference of the second separator 18.

As shown in FIG. 7, in each end of the second membrane electrode assembly 15 in the arrow C directions, the second sealing part 114b detours outwardly over a relatively wide region in the arrow B direction. As in a front elevational view of FIG. 7, a plurality of holes 116a and a plurality of rebuilt pin insert holes 118a are, for example, alternately formed between the upper detouring portion of the second sealing part 114b and the first sealing part 114a, and a plurality of holes 116b and a plurality of rebuilt pin insert holes 118b are, for example, alternately formed between the lower detouring portion of the second sealing part 114b and the first sealing part 114a. The holes 116a, 116b are positioned respectively in the opposite long sides such that each hole 116a faces each hole 116b. Similarly, the rebuilt pin insert holes 118a, 118b are positioned respectively in the opposite long sides such that each rebuilt pin insert hole 118a faces each rebuilt pin insert hole 118b.

The diameters and numbers of the holes 74a in the first separator 16, the holes 116a in the second membrane electrode assembly 15, the holes 98a in the second separator 18, and the holes 48a in the third separator 20 are equal to each other. The diameters and numbers of the holes 74b in the first separator 16, the holes 116b in the second membrane electrode assembly 15, the holes 98b in the second separator 18, and the holes 48b in the third separator 20 are equal to each other.

The diameters and numbers of the rebuilt pin insert holes 106a in the first membrane electrode assembly 14, the rebuilt pin insert holes 76a in the first separator 16, the rebuilt pin insert holes 118a in the second membrane electrode assembly 15, the rebuilt pin insert holes 100a in the second separator 18, and the rebuilt pin insert holes 50a in the third separator 20 are equal to each other.

The diameters and numbers of the rebuilt pin insert holes 106b in the first membrane electrode assembly 14, the rebuilt pin insert holes 76b in the first separator 16, the rebuilt pin insert holes 118b in the second membrane electrode assembly 15, the rebuilt pin insert holes 100b in the second separator 18, and the rebuilt pin insert holes 50b in the third separator 20 are equal to each other.

As shown in FIG. 7, four resin guiding members 108b are integrally formed with the frame portion 29 of the second membrane electrode assembly 15. The resin guiding member 108b has an outer end 110b, which is exposed to the outside through the recess 112 of the resin guiding member 108a in the first membrane electrode assembly 14 (see FIG. 6).

Figure 8:
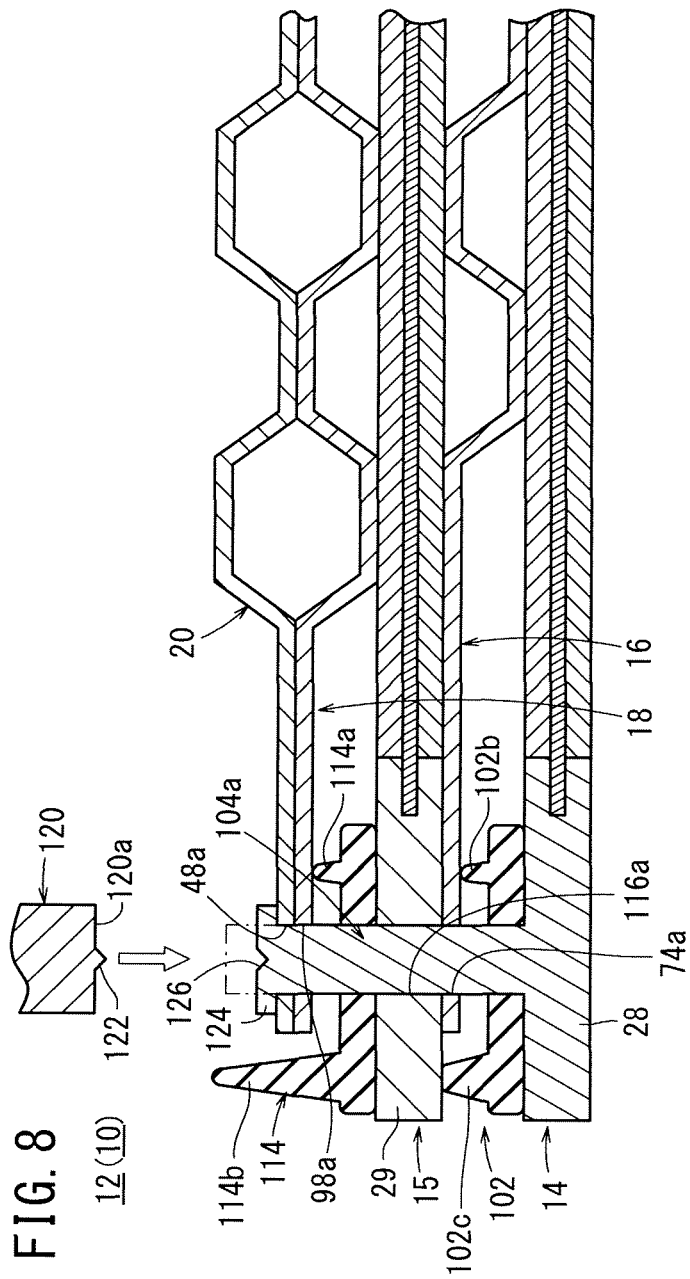
FIG. 8 is a cross-sectional view taken along the line VIII-VIII of FIG. 7.

As shown in FIG. 8, a plurality of the resin pins 104a formed integrally on the frame portion 28 of the first membrane electrode assembly 14 are inserted integrally into the holes 74a of the first separator 16, the holes 116a of the second membrane electrode assembly 15, the holes 98a of the second separator 18, and the holes 48a of the third separator 20.

A distal end of the resin pin 104a is formed by a welding tip 120 serving as a welding die. The welding tip 120 has a forming surface 120a, which is heated to a predetermined temperature. The forming surface 120a has an approximately conical crimping portion 122 protruding therefrom.

The welding tip 120 is heated to a predetermined temperature and then pressed against the distal end of the resin pin 104a. Thus, a head 124 is formed into a predetermined shape such as a large-diameter shape by the forming surface 120a of the welding tip 120, and a crimped recess 126 is formed by the crimping portion 122.

The resin pin 104a is crushed and deformed in the axial direction in this manner. Thus, the resin pin 104a is expanded outward in the diameter direction and integrally fitted to the inner surface of each of the holes 74a, 116a, 98a, and 48a with no gap therebetween. Incidentally, the resin pin 104b is the same as the above resin pin 104a.

The first separator 16, the second membrane electrode assembly 15, the second separator 18, and the third separator 20 are retained between the frame portion 28 and the heads 124 of the resin pins 104a and 104b on the first membrane electrode assembly 14.

The operation of the fuel cell 10 having the above structure will be described below.

As shown in FIG. 1, the oxidant gas such as the oxygen-containing gas supplied to the oxygen-containing gas supply passage 30a is supplied through the inlet channels 44a formed in the projection 42a of the third separator 20 to the first oxygen-containing gas flow field 36. Similarly, the oxygen-containing gas is supplied through the inlet channels 70a formed in the projection 60a of the first separator 16 to the second oxygen-containing gas flow field 64.

The oxygen-containing gas that has flowed through the first oxygen-containing gas flow field 36 is discharged through the outlet channels 44b formed in the projection 42b of the third separator 20 into the oxygen-containing gas discharge passage 30b. Similarly, the oxygen-containing gas that has flowed through the second oxygen-containing gas flow field 64 is discharged through the outlet channels 70b formed in the projection 60b of the first separator 16 into the oxygen-containing gas discharge passage 30b.

Meanwhile, the fuel gas such as the hydrogen-containing gas supplied to the fuel gas supply passage 32a is supplied through the inlet channels 62a formed in the projection 58a of the first separator 16 to the first fuel gas flow field 54. Similarly, the fuel gas is supplied through the inlet channels 88a formed in the projection 84a of the second separator 18 to the second fuel gas flow field 78.

The fuel gas that has flowed through the first fuel gas flow field 54 is discharged through the outlet channels 62b formed in the projection 58b of the first separator 16 into the fuel gas discharge passage 32b. Similarly, the fuel gas that has flowed through the second fuel gas flow field 78 is discharged through the outlet channels 88b formed in the projection 84b of the second separator 18 into the fuel gas discharge passage 32b.

Furthermore, the coolant such as pure water, ethylene glycol, oil, etc. supplied to the coolant supply passage 34a is supplied through the inlet channels 90a formed in the projection 86a of the second separator 18 to the coolant flow field 52. The coolant that has flowed through the coolant flow field 52 is discharged through the outlet channels 90b formed in the projection 86b into the coolant discharge passage 34b.

In the first embodiment, a plurality of the resin pins 104a and 104b are integrally formed on the frame portion 28 of the first membrane electrode assembly 14 and arranged in the arrow B direction. The resin pins 104a and 104b are inserted integrally into the holes in the other components (i.e., the holes 74a and 74b in the first separator 16, the holes 116a and 116b in the second membrane electrode assembly 15, the holes 98a and 98b in the second separator 18, and the holes 48a and 48b in the third separator 20) respectively, and then the resin pins 104a, 104b are subject to a welding process, whereby the large-diameter heads 124 and the crimped recesses 126 are formed.

Thus, the resin pins 104a and 104b are integrally fitted to the inner surfaces of the holes 74a, 74b, 116a, 116b, 98a, 98b, 48a, and 48b in the other components with no gap therebetween. Therefore, even when an impact load is applied to the fuel cell unit 12 from a long side thereof, the fuel cell unit 12 can reliably withstand the impact load.

Thus, in the first embodiment, the components of the fuel cell unit 12 (the first membrane electrode assembly 14, the first separator 16, the second membrane electrode assembly 15, the second separator 18, and the third separator 20) are not displaced with respect to each other in the shear direction, whereby the fuel cell unit 12 can advantageously secure desirable sealing and power generation performances.

Furthermore, the fuel cell unit 12 does not require separate dedicated fastening members, whereby the number of components can be effectively reduced thereby to lower the facility cost. Therefore, with a simple and economical structure, the fuel cell unit 12 containing the first membrane electrode assembly 14, the first separator 16, the second membrane electrode assembly 15, the second separator 18, and the third separator 20 can be accurately positioned, retained, and assembled with effectively improved workability.

Thus, the production process of the fuel cell (fuel cell stack) 10 formed by stacking a plurality of the fuel cell units 12, can be simplified, and the fuel cell unit 12 and the fuel cell 10 can be advantageously assembled with excellent workability.

When the assembled fuel cell 10 is disassembled for the purpose of replacing a deteriorated component, performing an analysis, etc., the resin pins 104a and 104b are broken, and then the fuel cell units 12 are separated away from each other. Meanwhile, rebuilt pins 129a and 129b are separately prepared.

The resin pins 104a and 104b become unusable after the process of disassembling the assembled fuel cell units 12, so that the separately prepared rebuilt pins 129a and 129b are used instead of the broken resin pins 104a and 104b.

Figure 9:
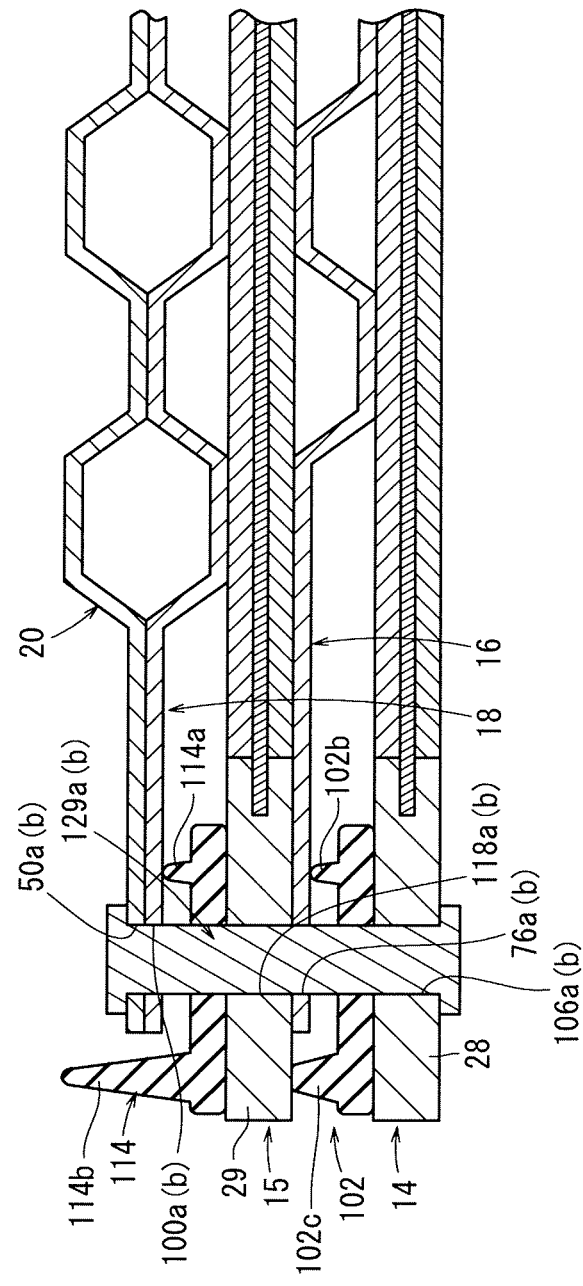
FIG. 9 is a cross-sectional view of the fuel cell unit of FIG. 1 integrated using rebuilt pins.

As shown in FIG. 9, the rebuilt pins 129a and 129b are integrally inserted into the rebuilt pin insert holes 106a, 106b, 76a, 76b, 118a, 118b, 100a, 100b, 50a, and 50b in the first membrane electrode assembly 14, the first separator 16, the second membrane electrode assembly 15, the second separator 18, and the third separator 20, and are subjected to a welding process as with the resin pins 104a, 104b. Thus, the fuel cell unit 12 is assembled again.

A fuel cell 210 according to a second embodiment of the present invention is shown in FIGS. 10 to 18. Constituent elements, which are the same as those of the fuel cell 10 including the fuel cell unit 12 according to the first embodiment, are labeled with the same reference numerals, and detailed descriptions of such features are omitted.

Figure 10:
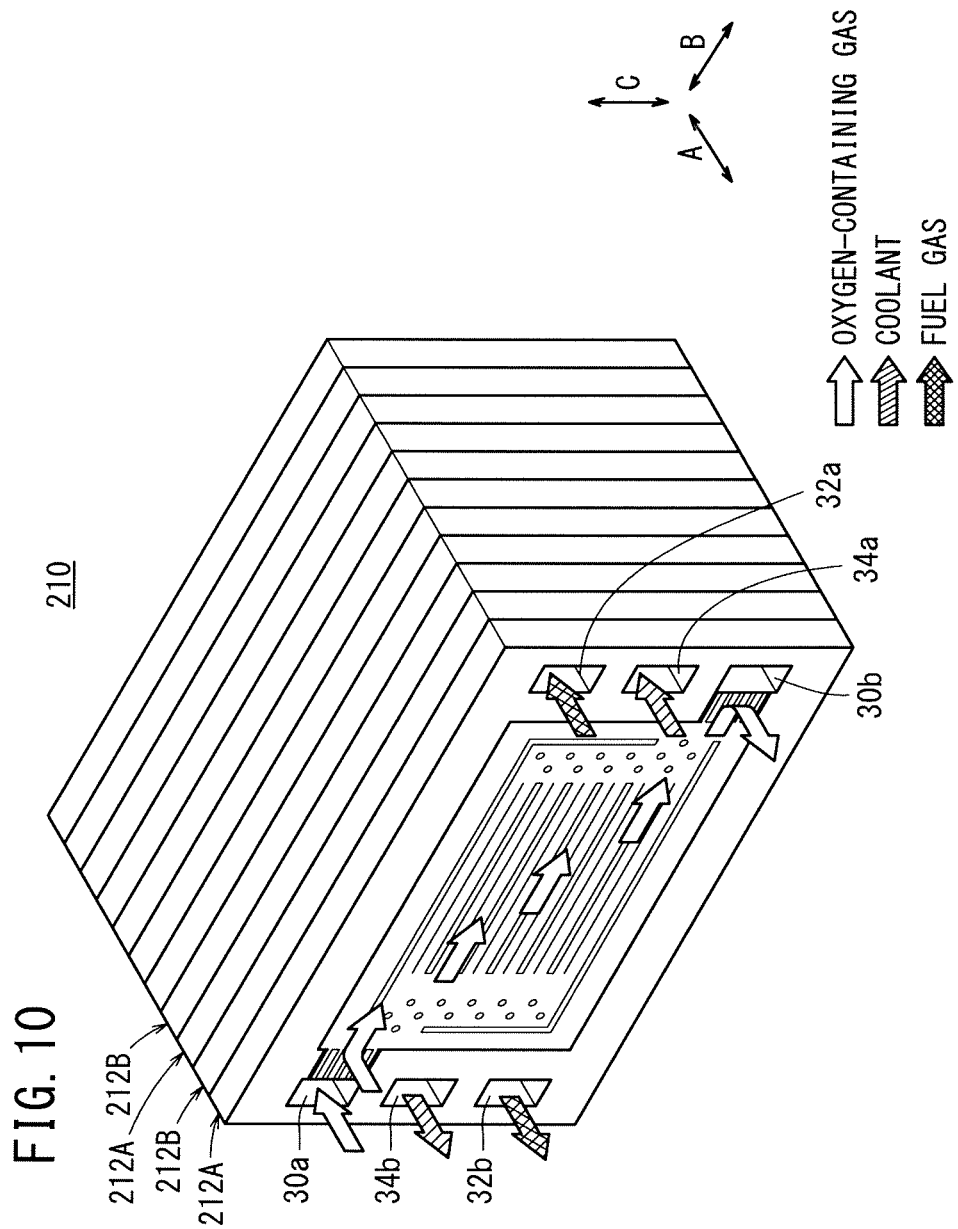
FIG. 10 is an external perspective view of a fuel cell according to a second embodiment of the present invention.

As shown in FIG. 10, the fuel cell 210 is formed by stacking fuel cell units 212A and 212B alternately. The fuel cell unit 212A has the same structure as the fuel cell unit 12 according to the first embodiment.

A first membrane electrode assembly 214A, a second membrane electrode assembly 215A, a first separator 216A, a second separator 218A, and a third separator 220A in the fuel cell unit 212A correspond respectively to and have approximately the same shapes respectively as the first membrane electrode assembly 14, the second membrane electrode assembly 15, the first separator 16, the second separator 18, and the third separator 20 in the fuel cell unit 12 of the first embodiment.

Frame portions 228A and 229A in the fuel cell unit 212A correspond respectively to the frame portions 28 and 29 in the fuel cell unit 12 of the first embodiment, and resin pins (resin projections) 304*a* and 304*b* in the frame portion 228A correspond respectively to and have approximately the same shapes respectively as the resin pins 104*a* and 104*b* in the frame portion 28.

Similarly, projections 246*a*, 246*b*, 272*a*, 272*b*, 296*a*, and 296*b* in the fuel cell unit 212A correspond respectively to and have approximately the same shapes respectively as the projections 46*a*, 46*b*, 72*a*, 72*b*, 96*a*, and 96*b* in the fuel cell unit 12. Thus, holes 248*a*, 248*b*, 274*a*, 274*b*, 298*a*, 298*b*, 316*a*, and 316*b* in the fuel cell unit 212A correspond to and have approximately the same shapes as the holes 48*a*, 48*b*, 74*a*, 74*b*, 98*a*, 98*b*, 116*a*, and 116*b* in the fuel cell unit 12, respectively. Furthermore, rebuilt pin insert holes 250*a*, 250*b*, 276*a*, 276*b*, 300*a*, 300*b*, 306*a*, 306*b*, 318*a*, and 318*b* in the fuel cell unit 212A correspond to and have approximately the same shapes as the rebuilt pin insert holes 50*a*, 50*b*, 76*a*, 76*b*, 100*a*, 100*b*, 106*a*, 106*b*, 118*a*, and 118*b* in the fuel cell unit 12, respectively.

On the other hand, the fuel cell unit 212B has approximately the same structure as the fuel cell unit 212A, and contains a first membrane electrode assembly 214B, a first separator 216B, a second membrane electrode assembly 215B, a second separator 218B, and a third separator 220B stacked in this order. The difference between the fuel cell units 212A and 212B will be described in detail below.

Figure 14:
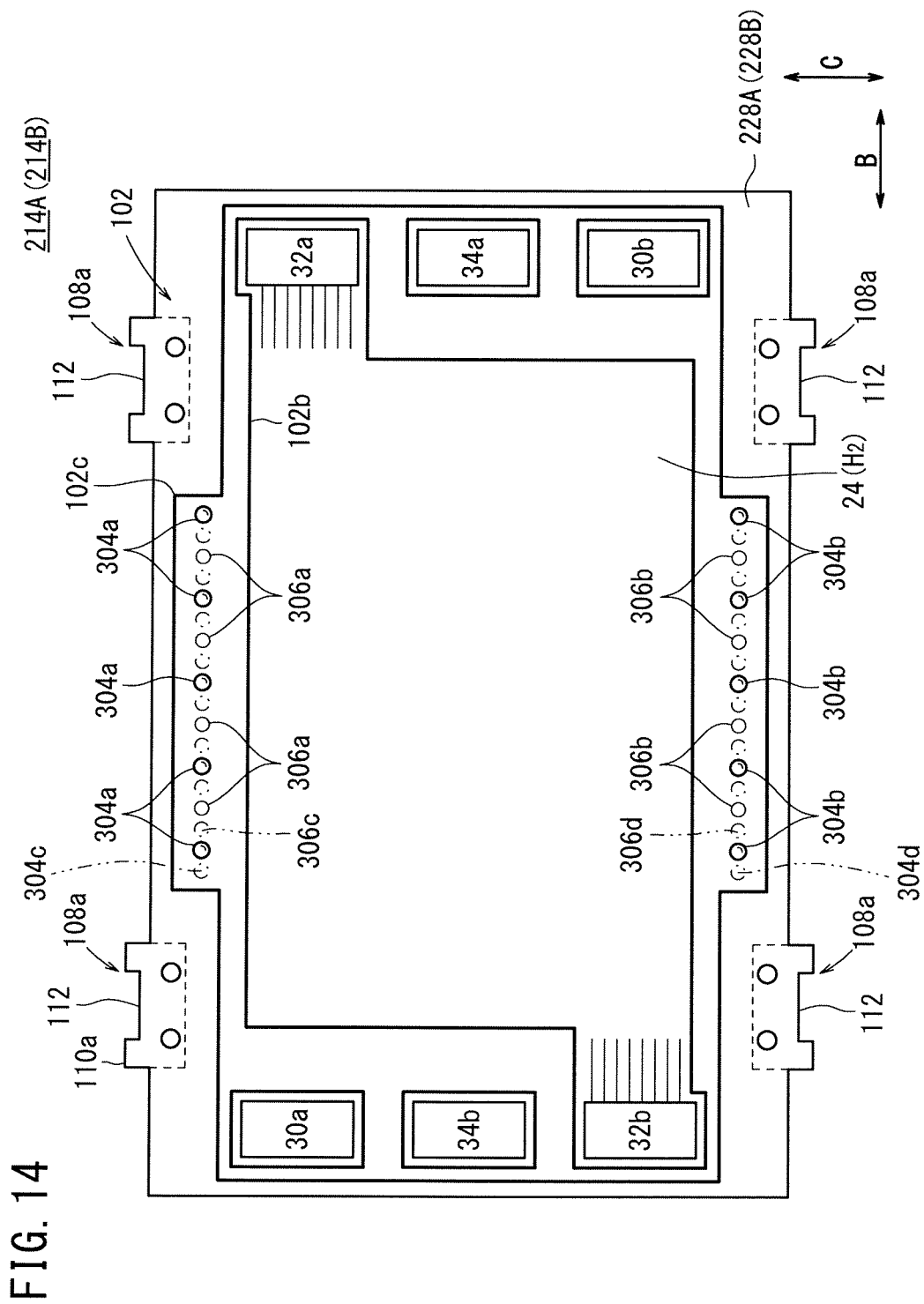
FIG. 14 is a front elevational view of a first membrane electrode assembly of the fuel cell of FIG. 10.
Figure 16:
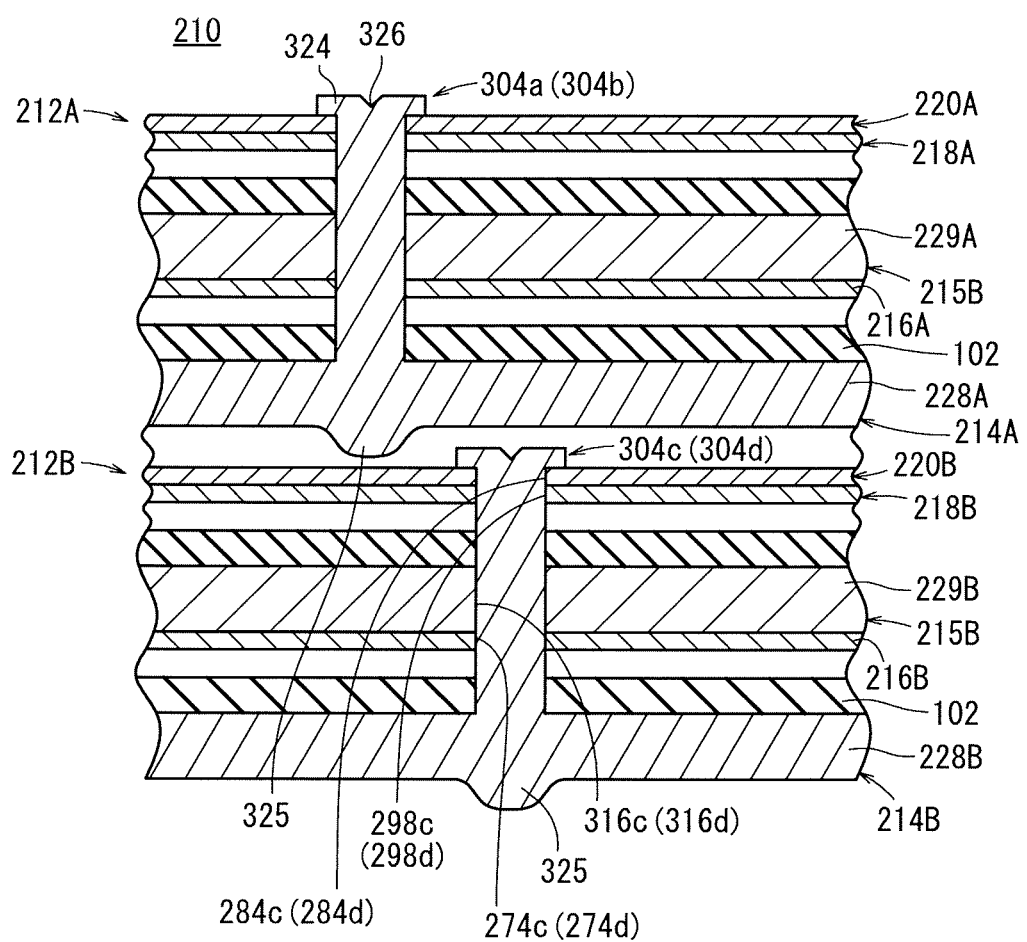
FIG. 16 is a cross-sectional view taken along the line XVI-XVI of FIG. 15.

As shown in FIGS. 14 and 16, the fuel cell unit 212B has resin pins (resin projections) 304*c* and 304*d* as fastening members, and the positions of the resin pins 304*c* and 304*d* in the fuel cell unit 212B are different from those of the resin pins 304*a* and 304*b* in the fuel cell unit 212A, respectively. In this case, the resin pins 304*a* and 304*c* are arranged in a staggered manner such that the bottom 325 of the resin pin 304*a* (at one side in the stacking direction) and the head 324 of the resin pin 304*c* (at the other side in the stacking direction) are not overlapped with each other in the stacking direction, and the head 324 of the resin pin 304*a* (at the other side in the stacking direction) and the bottom 325 of the resin pin 304*c* (at the one side in the stacking direction) are not overlapped with each other in the stacking direction.

Figure 17:
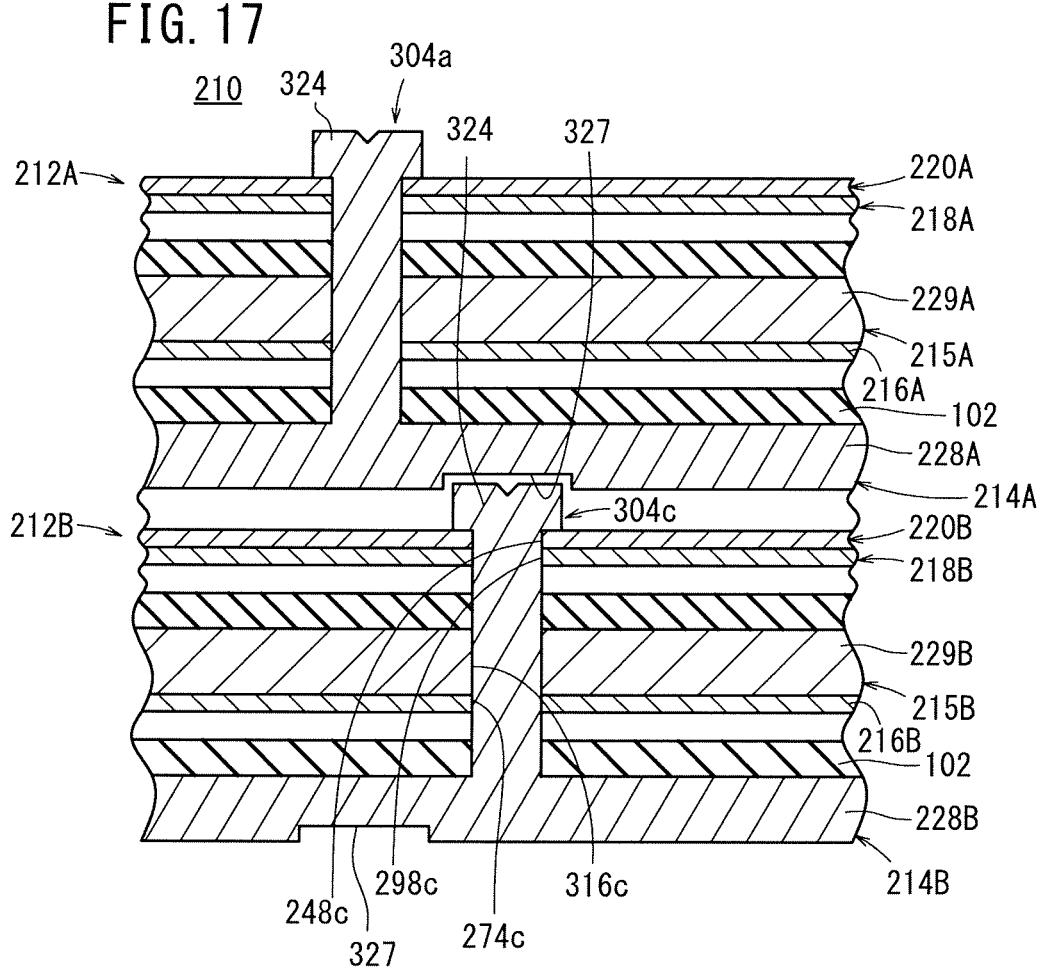
FIG. 17 is a cross-sectional view of another resin pin used in the fuel cell of FIG. 10.

As shown in FIG. 17, instead of the above structure, the fuel cell 210 may have a structure having recesses 327 in the frame portions 228A and 228B of the first membrane electrode assemblies 214A and 214B, whereby the heads 324 of the resin pins 304*a* and 304*c* are received in the recesses 327.

Figure 11:
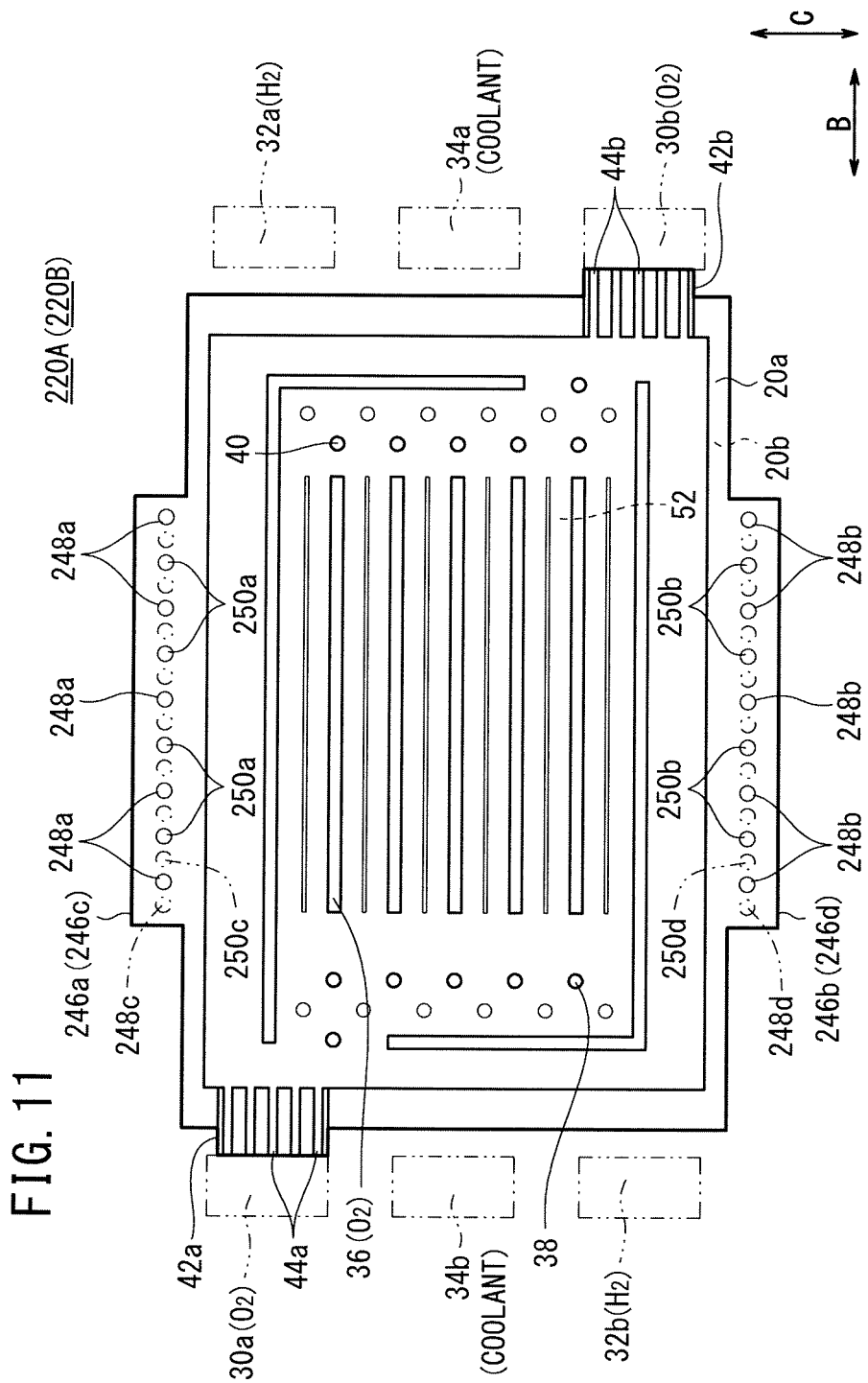
FIG. 11 is a front elevational view of a third separator of the fuel cell of FIG. 10.

As shown in FIG. 11, holes 248*c* and rebuilt pin insert holes 250*c* of the third separator 220B are arranged between the holes 248*a* and the rebuilt pin insert holes 250*a* of the third separator 220A in the fuel cell unit 212A, respectively. Thus, the holes 248*c* and the rebuilt pin insert holes 250*c* of the third separator 220B are not overlapped with the holes 248*a* and the rebuilt pin insert holes 250*a* of the third separator 220A in the stacking direction. Similarly, holes 248*d* and rebuilt pin insert holes 250*d* are arranged between the holes 248*b* and the rebuilt pin insert holes 250*b* in the fuel cell unit 212A, respectively.

The holes 248*c*, 248*d* are positioned respectively in the opposite long sides (projections 246*c*, 246*d*) such that each hole 248*c* faces each hole 248*d*. Similarly, the rebuilt pin insert holes 250*c*, 250*d* are positioned respectively in the opposite long sides (projections 246*c*, 246*d*) such that each rebuilt pin insert hole 250*c* faces each rebuilt pin insert hole 250*d*.

Figure 12:
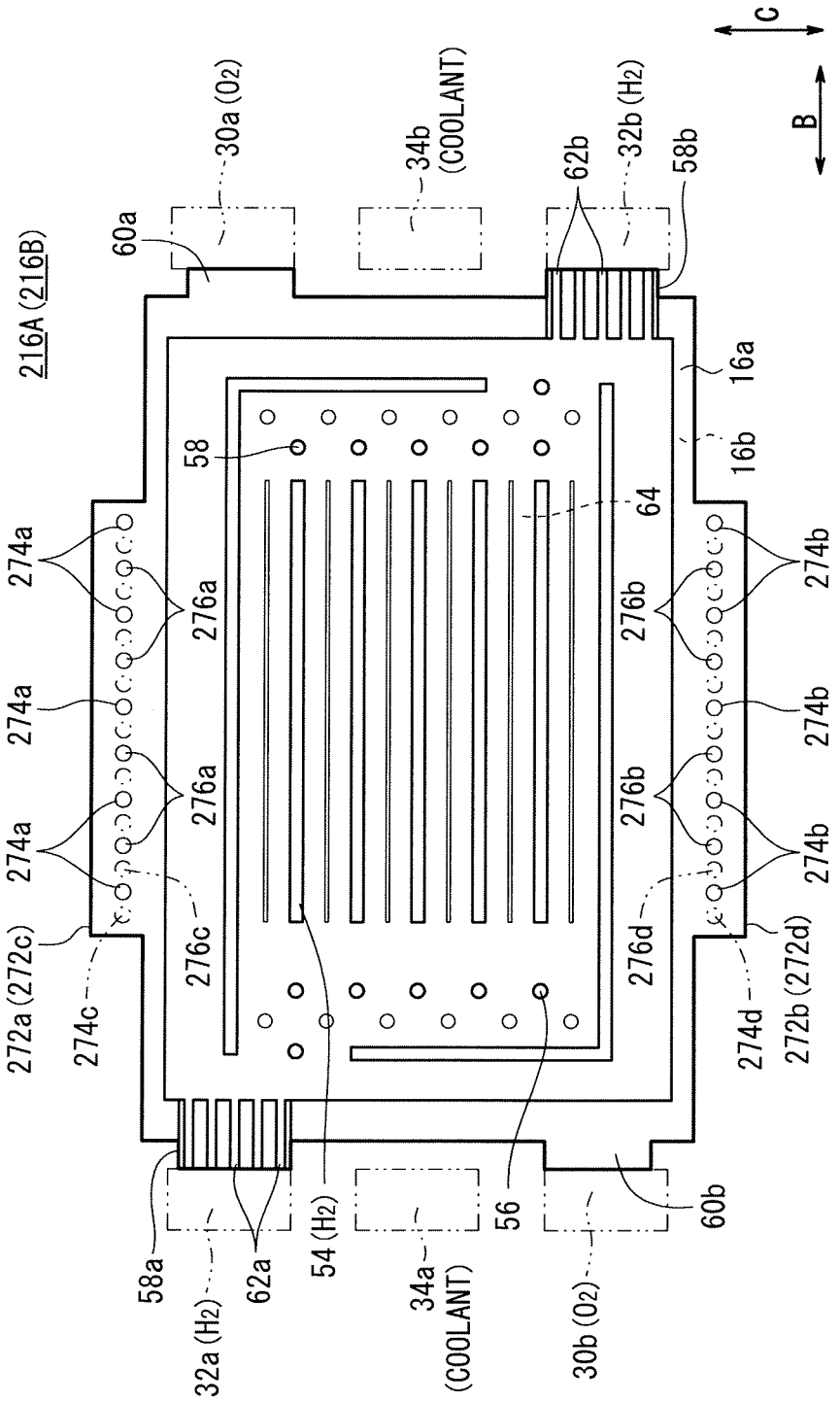
FIG. 12 is a front elevational view of a first separator of the fuel cell of FIG. 10.

As shown in FIG. 12, holes 274*c* and rebuilt pin insert hole 276*c* of the first separator 216B are arranged between the holes 274*a* and the rebuilt pin insert holes 276*a* of the first separator 216A in the fuel cell unit 212A, respectively. Similarly, holes 274*d* and rebuilt pin insert holes 276*d* are arranged between the holes 274*b* and the rebuilt pin insert holes 276*b* in the fuel cell unit 212A, respectively.

The holes 274*c*, 274*d* are positioned respectively in the opposite long sides (projections 272*c*, 272*d*) such that each hole 274*c* faces each hole 274*d*. Similarly, the rebuilt pin insert holes 276*c*, 276*d* are positioned respectively in the opposite long sides (projections 272*c*, 272*d*) such that each rebuilt pin insert hole 276*c* faces each rebuilt pin insert hole 276*d*.

Figure 13:
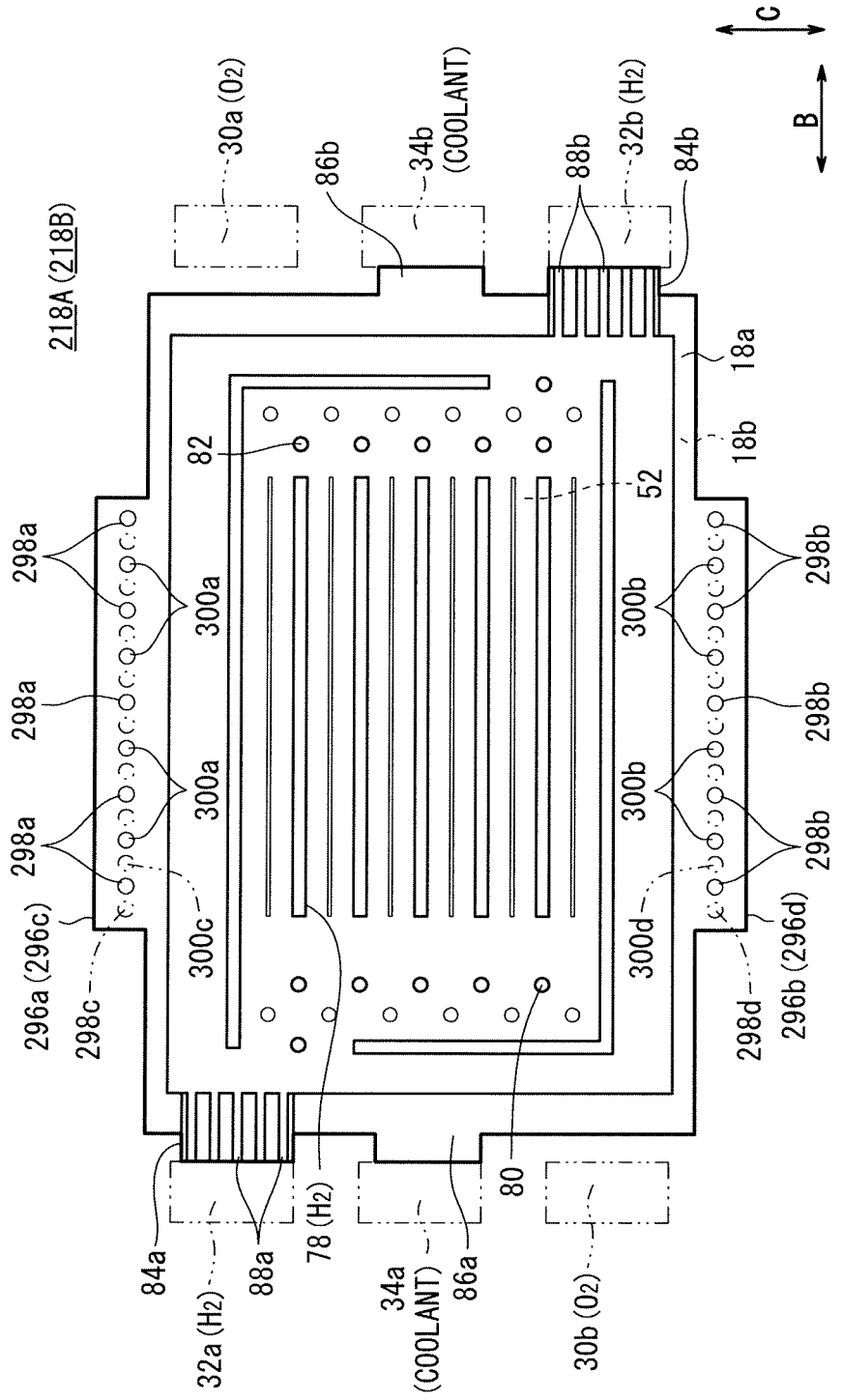
FIG. 13 is a front elevational view of a second separator of the fuel cell of FIG. 10.

As shown in FIG. 13, holes 298*c* and rebuilt pin insert holes 300*c* of the second separator 218B are arranged between the holes 298*a* and the rebuilt pin insert holes 300*a* of the second separator 218A in the fuel cell unit 212A, respectively. Similarly, holes 298*d* and rebuilt pin insert holes 300*d* are arranged between the holes 298*b* and the rebuilt pin insert holes 300*b* in the fuel cell unit 212A, respectively.

The holes 298*c*, 298*d* are positioned respectively in the opposite long sides (projections 296*c*, 296*d*) such that each hole 298*c* faces each hole 298*d*. Similarly, the rebuilt pin insert holes 300*c*, 300*d* are positioned respectively in the opposite long sides (projections 296*c*, 296*d*) such that each rebuilt pin insert hole 300*c* faces each rebuilt pin insert hole 300*d*.

As shown in FIG. 14, the resin pins 304*c* and the rebuilt pin insert holes 306*c* of the first membrane electrode assembly 214B are arranged between the resin pins 304*a* and the rebuilt pin insert holes 306*a* of the first membrane electrode assembly 214A in the fuel cell unit 212A, respectively. Similarly, the resin pins 304*d* and the rebuilt pin insert holes 306*d* are arranged between the resin pins 304*b* and the rebuilt pin insert holes 306*b* in the fuel cell unit 212A, respectively.

The resin pins 304*c*, 304*d* are positioned respectively in the opposite long sides such that each resin pin 304*c* faces each resin pin 304*d*. Similarly, the rebuilt pin insert holes 306*c*, 306*d* are positioned respectively in the opposite long sides such that each rebuilt pin insert hole 306*c* faces each rebuilt pin insert hole 306*d*.

Figure 15:
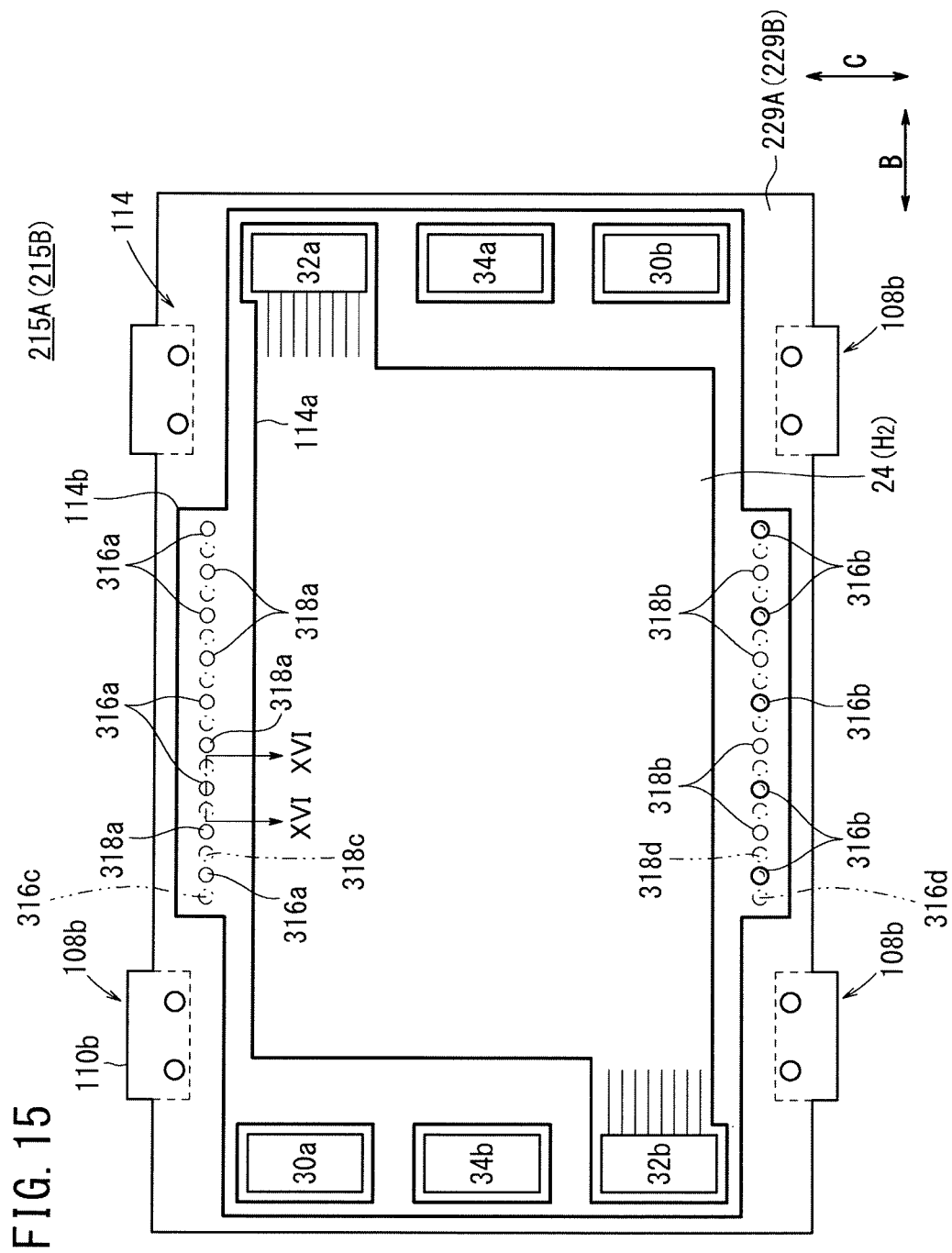
FIG. 15 is a front elevational view of a second membrane electrode assembly of the fuel cell of FIG. 10.

As shown in FIG. 15, holes 316*c* and rebuilt pin insert holes 318*c* of the second membrane electrode assembly 215B are arranged between the holes 316*a* and rebuilt pin insert holes 318*a* of the second membrane electrode assembly 215A in the fuel cell unit 212A, respectively. Similarly, holes 316*d* and rebuilt pin insert holes 318*d* are arranged between the holes 316*b* and the rebuilt pin insert holes 318*b* in the fuel cell unit 212A, respectively.

The holes 316*c*, 316*d* are positioned respectively in the opposite long sides such that each hole 316*c* faces each hole 316*d*. Similarly, the rebuilt pin insert holes 318*c*, 318*d* are positioned respectively in the opposite long sides such that each rebuilt pin insert hole 318*c* faces each rebuilt pin insert hole 318*d*.

Also in the fuel cell unit 212B, a plurality of the resin pins 304*c* and 304*d* are formed integrally on the frame portion 228B of the first membrane electrode assembly 214B and arranged in the arrow B direction. The resin pins 304*c* and 304*d* are integrally inserted into the holes in the other components (i.e., the holes 274*c* and 274*d* in the first separator 216B, the holes 316*c* and 316*d* in the second membrane electrode assembly 215B, the holes 298*c* and 298*d* in the second separator 218B, and the holes 248c and 248d in the third separator 220B) respectively, and then the resin pins 304c, 304d are subjected to a welding process, whereby the large-diameter heads 324 and the crimped recesses 326 are formed, as shown in FIG. 16.

Therefore, the fuel cell unit 212B is integrally retained using the fastening members of the resin pins 304c and 304d and the holes 274c, 274d, 316c, 316d, 298c, 298c, 248c, and 248d. In this case, the fuel cell units 212A and 212B adjacent to each other are arranged such that the resin pins 304a and 304b are not overlapped with the resin pins 304c and 304d in the stacking direction respectively (see FIGS. 14 and 16).

Thus, in the fuel cell 210 of the second embodiment, the resin pins 304a and 304b do not interfere with the resin pins 304c and 304d in the stacking direction respectively. Consequently, with a simple and economical structure, the fuel cell units 212A and 212B can be accurately positioned and retained, and the entire fuel cell 210 can be miniaturized in the stacking direction, advantageously.

Also in the second embodiment, when the assembled fuel cell 210 is taken apart, the resin pins 304a, 304b, 304c, and 304d are broken to separate the fuel cell units 212A and 212B from each other.

When the disassembled fuel cell units 212A and 212B are assembled again, the rebuilt pins 129a and 129b are integrally inserted into the rebuilt pin insert holes 306a, 306b, 306c, and 306d in the first membrane electrode assemblies 214A and 214B, the rebuilt pin insert holes 276a, 276b, 276c, and 276d in the first separators 216A and 216B, the rebuilt pin insert holes 318a, 318b, 318c, and 318d in the second membrane electrode assemblies 215A and 215B, the rebuilt pin insert holes 300a, 300b, 300c, and 300d in the second separators 218A and 218B, and the rebuilt pin insert holes 250a, 250b, 250c, and 250d in the third separators 220A and 220B respectively, and then are subjected to a welding process, as in the resin pins 304c, 304d.

The fuel cell units 212A and 212B are arranged such that the rebuilt pin insert holes 306a, 306b, 276a, 276b, 318a, 318b, 300a, 300b, 250a, and 250b are not overlapped with the rebuilt pin insert holes 306c, 306d, 276c, 276d, 318c, 318d, 300c, 300d, 250c, and 250d in the stacking direction, respectively. Thus, the rebuilt pins do not interfere with each other in the stacking direction, whereby the entire fuel cell 210 can be miniaturized in the stacking direction.

Next, a fuel cell 330 according to a modified example of the second embodiment will be described below with reference to FIG. 18.

The fuel cell 330 contains fuel cell units 332A and 332B stacked alternately. First membrane electrode assemblies 334A and 334B of the fuel cell units 332A and 332B have approximately the same shapes as the first membrane electrode assemblies 214A and 214B of the fuel cell 210 of the second embodiment, and have holes (preferably stepped holes) 344 at positions corresponding to the positions of the resin pins 304a and 304c, respectively. Also, the resin pins 304b and 304d of the second embodiment are modified in the same manner though not shown in the drawing.

In the fuel cell unit 332A, resin clips (resin clip members) 346 are integrally inserted into the holes 344 in the first membrane electrode assembly 334A, the holes 274a in the first separator 216A, the holes 316a in the second membrane electrode assembly 215A (see FIG. 15), the holes 298a in the second separator 218A (see FIG. 13), and the holes 248a in the third separator 220A (see FIG. 11). Also in the fuel cell unit 332B, the resin clips 346 are integrally inserted in the same manner as the fuel cell unit 332A.

A split (slit) 348 is formed on a head 346a of the resin clip 346. The split 348 may comprise one slit extending in the diameter direction or a plurality of slits formed at regular angular intervals. A bottom 346b of the resin clip 346 is disposed in each hole 344 of the first membrane electrode assemblies 334A and 334B with a space S between the bottom 346b and the hole 344. Incidentally, for example, the head of the resin clip 346 may be welded without forming the split 348.

Figure 18:
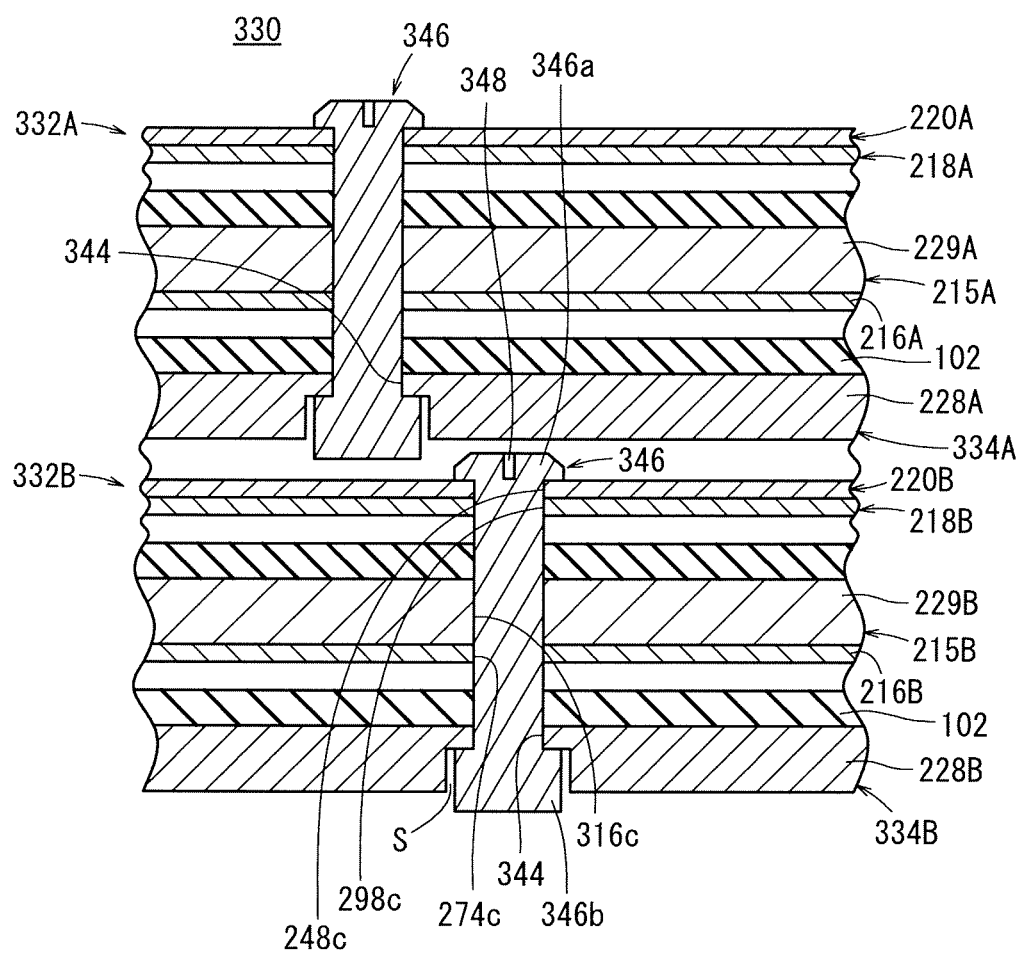
FIG. 18 is a cross-sectional view of main components of a fuel cell according to a modification of the fuel cell of FIG. 10.

The resin clip 346 in the fuel cell unit 332A is not overlapped with the resin clip 346 in the fuel cell unit 332B in the stacking direction (see FIG. 18). Therefore, in the fuel cell 330 of the modification, with a simple and economical structure, the fuel cell units 332A and 332B can be accurately positioned and retained, and the entire fuel cell 330 can be miniaturized in the stacking direction, advantageously.

Then, a fuel cell 410 according to a third embodiment of the present invention will be described below with reference to FIGS. 19 to 26. Constituent elements, which are the same as those of the fuel cell 10 including the fuel cell unit 12 according to the first embodiment, are labeled with the same reference numerals, and detailed descriptions of such features are omitted.

Figure 19:
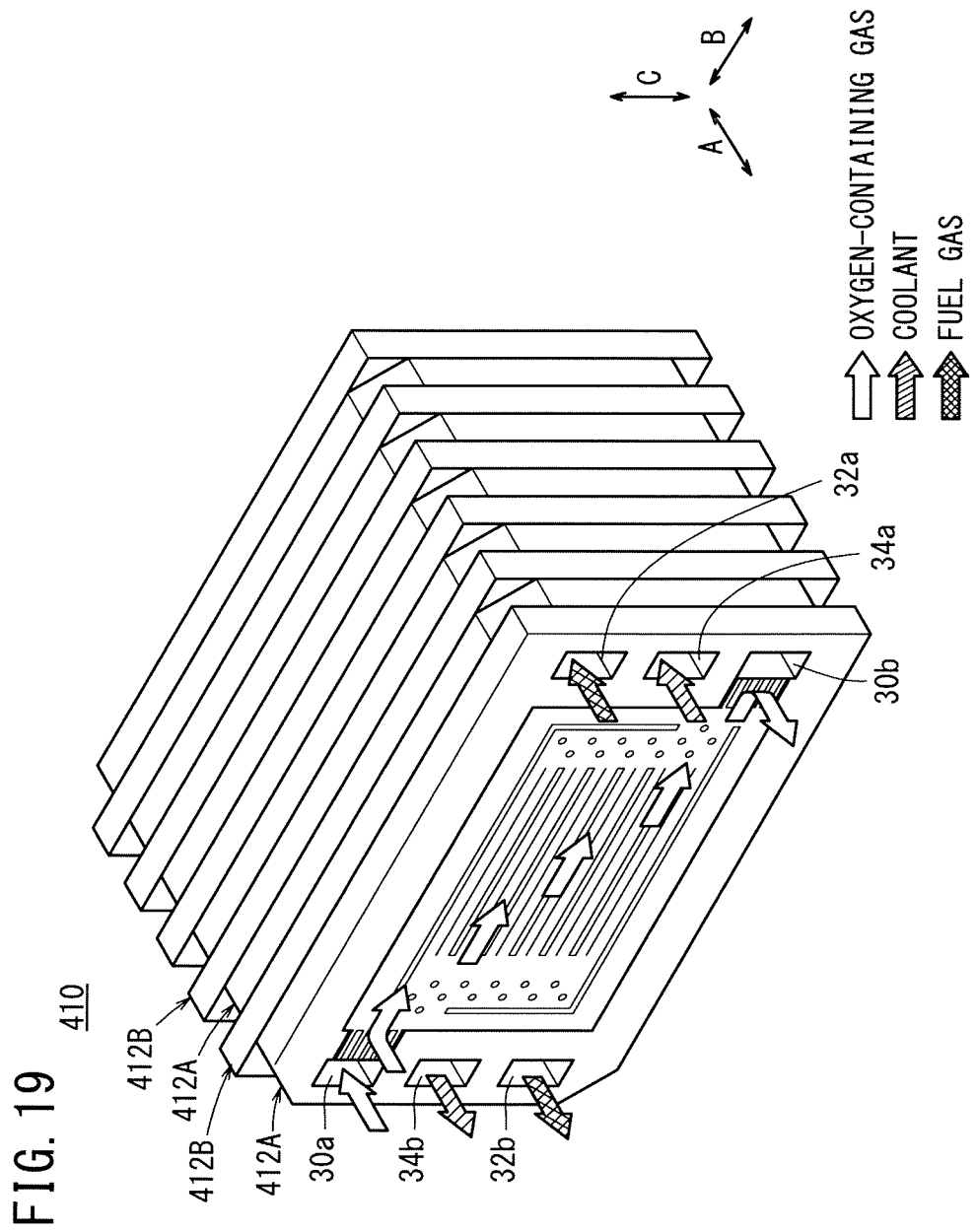
FIG. 19 is an external perspective view of a fuel cell according to a third embodiment of the present invention.

As shown in FIG. 19, fuel cell units 412A and 412B are alternately stacked in the fuel cell 410. The fuel cell units 412A and 412B have the same shape. Further, the fuel cell units 412A, 412B are of substantially the same shape as the fuel cell unit 12 of the first embodiment.

A first membrane electrode assembly 414, a second membrane electrode assembly 415, a first separator 416, a second separator 418, and a third separator 420 in the fuel cell units 412A and 412B (see FIG. 20) correspond respectively to and have approximately the same shapes respectively as the first membrane electrode assembly 14, the second membrane electrode assembly 15, the first separator 16, the second separator 18, and the third separator 20 in the fuel cell unit 12 of the first embodiment.

Figure 20:
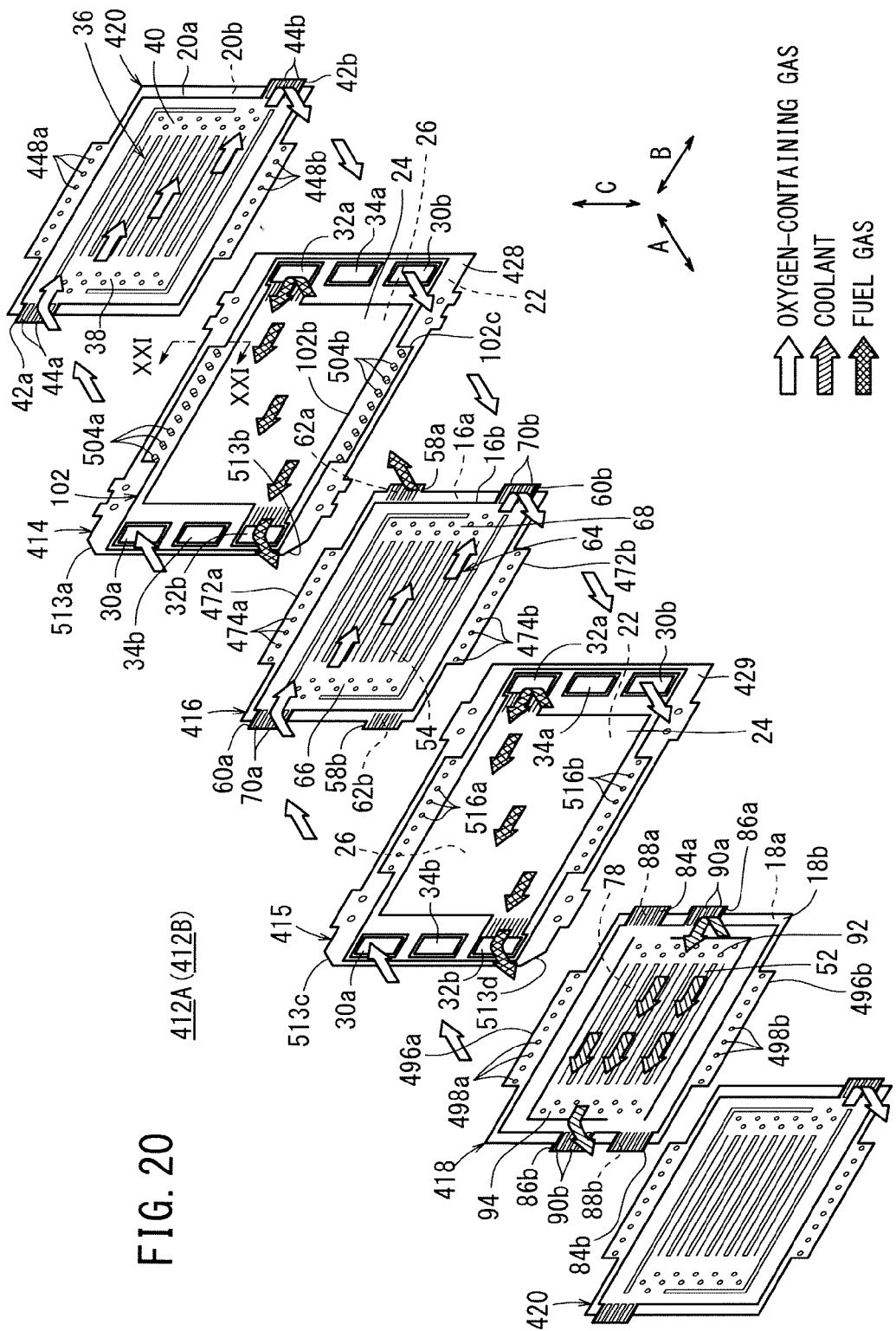
FIG. 20 is an exploded perspective view of main components of a fuel cell unit of the fuel cell of FIG. 19.
Figure 21:
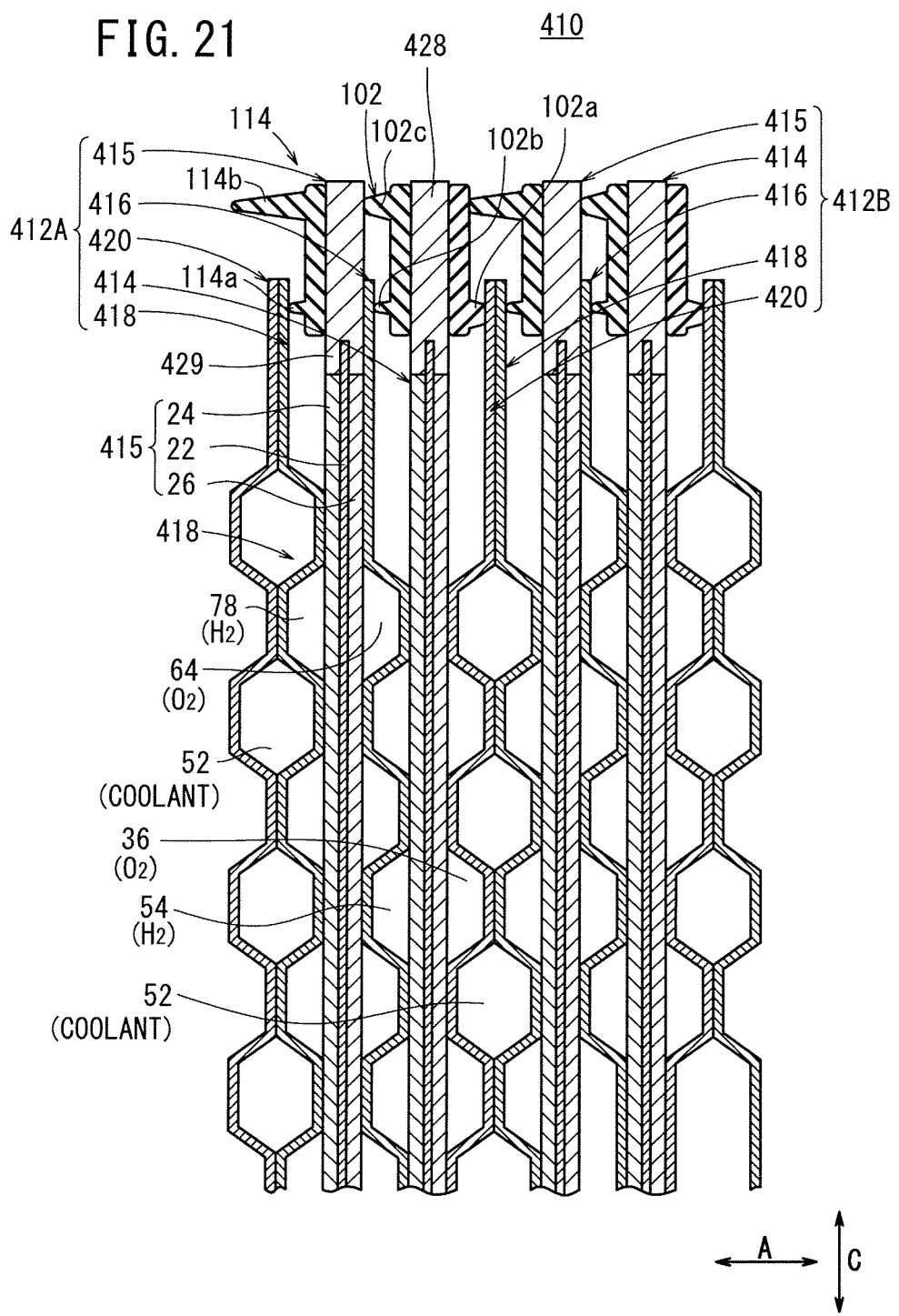
FIG. 21 is a cross-sectional view taken along the line XXI-XXI of FIG. 20.

As shown in FIGS. 20 and 21, in the fuel cell units 412A and 412B, the first membrane electrode assembly 414, the first separator 416, the second membrane electrode assembly 415, the second separator 418, and the third separator 420 are stacked in this order.

Frame portions (picture-frame-like resin frame) 428 and 429 in the fuel cell units 412A and 412B correspond respectively to the frame portions 28 and 29 in the fuel cell unit 12 of the first embodiment, and resin pins 504a and 504b provided integrally on the frame portion 428 correspond to and have substantially the same shapes as the resin pins 104a and 104b on the frame portion 28, respectively.

Similarly, projections 446a, 446b, 472a, 472b, 496a, and 496b in the fuel cell units 412A and 412B correspond to and have substantially the same shapes as the projections 46a, 46b, 72a, 72b, 96a, and 96b in the fuel cell unit 12 of the first embodiment, respectively (see FIGS. 20 and 22 to 24). Thus, holes 448a, 448b, 474a, 474b, 498a, 498b, 516a, and 516b in the fuel cell units 412A and 412B correspond to and have substantially the same shapes as the holes 48a, 48b, 74a, 74b, 98a, 98b, 116a, and 116b in the fuel cell unit 12.

Figure 22:
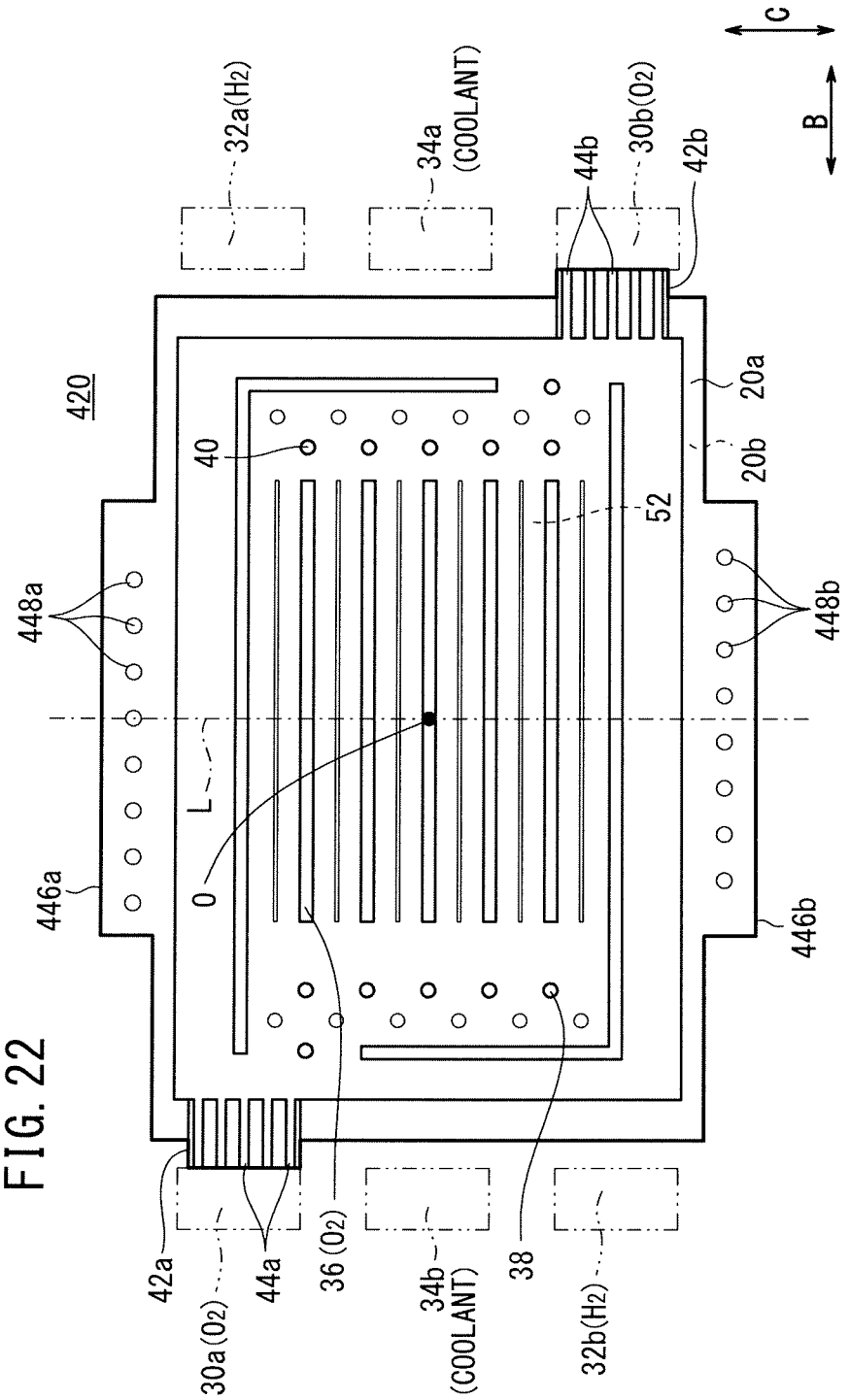
FIG. 22 is a front elevational view of a third separator of the fuel cell of FIG. 19.

As shown in FIG. 22, in the projection 446a of the third separator 420, a plurality of the holes 448a are arranged as through holes at regular intervals in the arrow B direction. Also in the projection 446b, a plurality of the holes 448b are arranged as through holes at regular intervals in the arrow B direction.

In the third separator 420, a centerline L of the long sides passes through an axis O perpendicular to the electrode surface of the third separator 420. The centerline L passes through the center of one of the holes 448a on one long side (the projection 446a) and passes between the holes 448b on the other long side (the projection 446b). More specifically, when the third separator 420 is rotated 180° about the axis O, the post-rotation positions of the holes 448a on the one long side are located between the pre-rotation positions of the holes 448b on the other long side. In other words, the post-rotation positions of the holes 448a are shifted by half pitch from the pre-rotation positions of the holes 448b.

Figure 23:
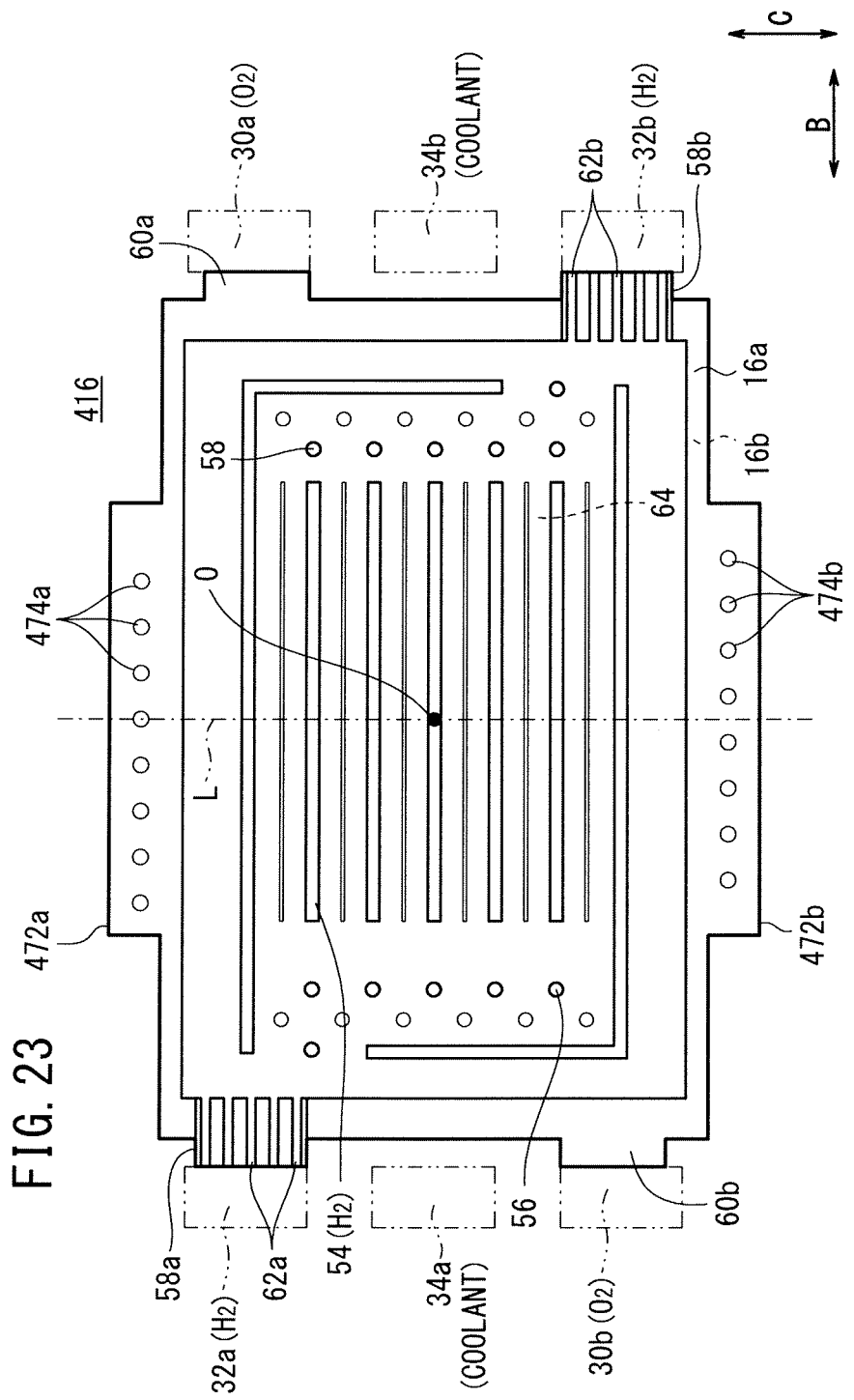
FIG. 23 is a front elevational view of a first separator of the fuel cell of FIG. 19.

As shown in FIG. 23, in the projection 472a of the first separator 416, a plurality of the holes 474a are arranged as through holes at regular intervals in the arrow B direction. Also in the projection 472b, a plurality of the holes 474b are arranged as through holes at regular intervals in the arrow B direction.

In the first separator 416, a centerline L of the long sides passes through an axis O perpendicular to the electrode surface of the first separator 416. The centerline L passes through the center of one of the holes 474a on one long side (the projection 472a) and passes between the holes 474b on the other long side (the projection 472b). More specifically, when the first separator 416 is rotated 180° about the axis O, the post-rotation positions of the holes 474a on the one long side are located between the pre-rotation positions of the holes 474b on the other long side. In other words, the post-rotation positions of the holes 474a are shifted by half pitch from the pre-rotation positions of the holes 474b.

Figure 24:
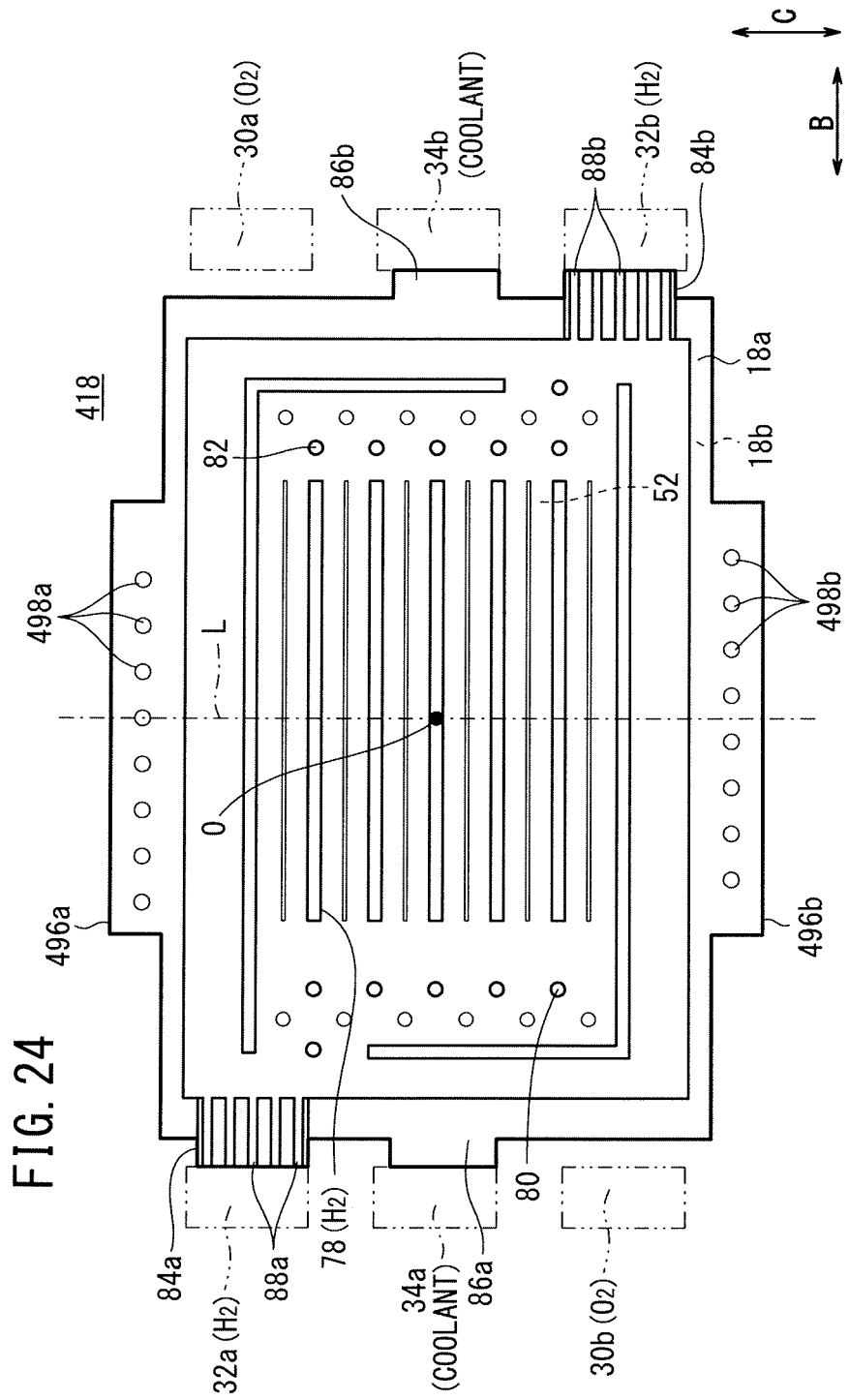
FIG. 24 is a front elevational view of a second separator of the fuel cell of FIG. 19.

As shown in FIG. 24, in the projection 496a of the second separator 418, a plurality of the holes 498a are arranged as through holes at regular intervals in the arrow B direction. Also in the projection 496b, a plurality of the holes 498b are arranged as through holes at regular intervals in the arrow B direction.

In the second separator 418, a centerline L of the long sides passes through an axis O perpendicular to the electrode surface of the second separator 418. The centerline L passes through the center of one of the holes 498a on one long side (the projection 496a) and passes between the holes 498b on the other long side (the projection 496b). More specifically, when the second separator 418 is rotated 180° about the axis O, the post-rotation positions of the holes 498a on the one long side are located between the pre-rotation positions of the holes 498b on the other long side. In other words, the post-rotation positions of the holes 498a are shifted by half pitch from the pre-rotation positions of the holes 498b.

Figure 25:
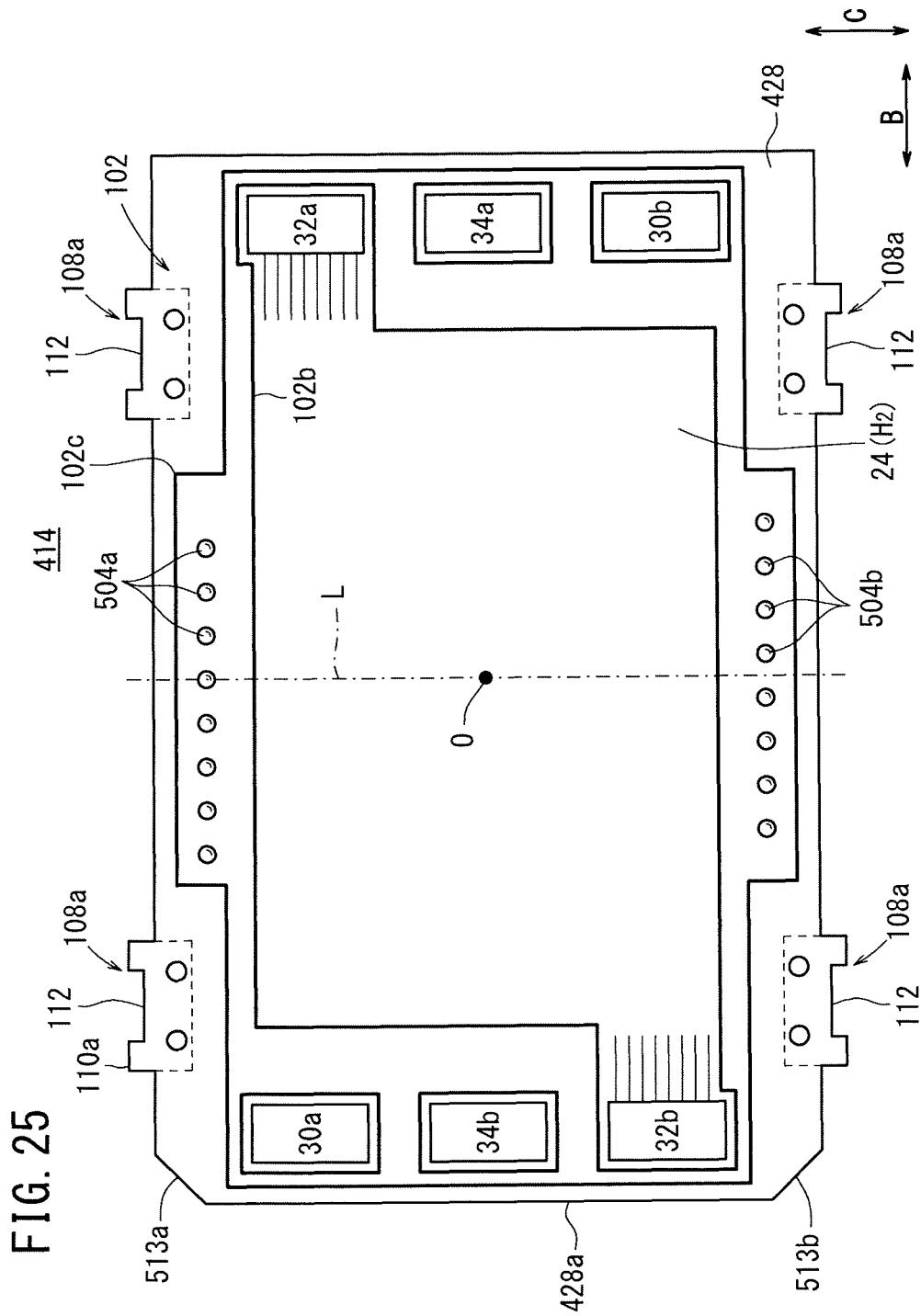
FIG. 25 is a front elevational view of a first membrane electrode assembly of the fuel cell of FIG. 19.

As shown in FIG. 25, in the first membrane electrode assembly 414, as viewed in a front view of FIG. 25, between the upper detouring portion of the third sealing part 102c and the second sealing part 102b, a plurality of the resin pins (resin projections) 504a are arranged as fastening members at regular intervals in the arrow B direction. Also between the lower detouring portion of the third sealing part 102c and the second sealing part 102b, a plurality of the resin pins (resin projections) 504b are arranged as fastening members at regular intervals in the arrow B direction.

In the first membrane electrode assembly 414, a centerline L of the long sides passes through an axis O perpendicular to the electrode surface of the first membrane electrode assembly 414. The centerline L passes through the center of one of the resin pins 504a on one long side and passes between the resin pins 504b on the other long side. More specifically, when the first membrane electrode assembly 414 is rotated 180° about the axis O, the post-rotation positions of the resin pins 504a on the one long side are located between the pre-rotation positions of the resin pins 504b on the other long side. In other words, the post-rotation positions of the resin pins 504a are shifted by half pitch from the pre-rotation positions of the resin pins 504b.

In the first membrane electrode assembly 414, cutouts (or projections or markers) (identification portions for rotational position detection) 513a and 513b are formed at both corners (or one corner) of one short side 428a of the frame portion 428, on which the oxygen-containing gas supply passage 30a, the coolant discharge passage 34b, and the fuel gas discharge passage 32b are formed.

Figure 26:
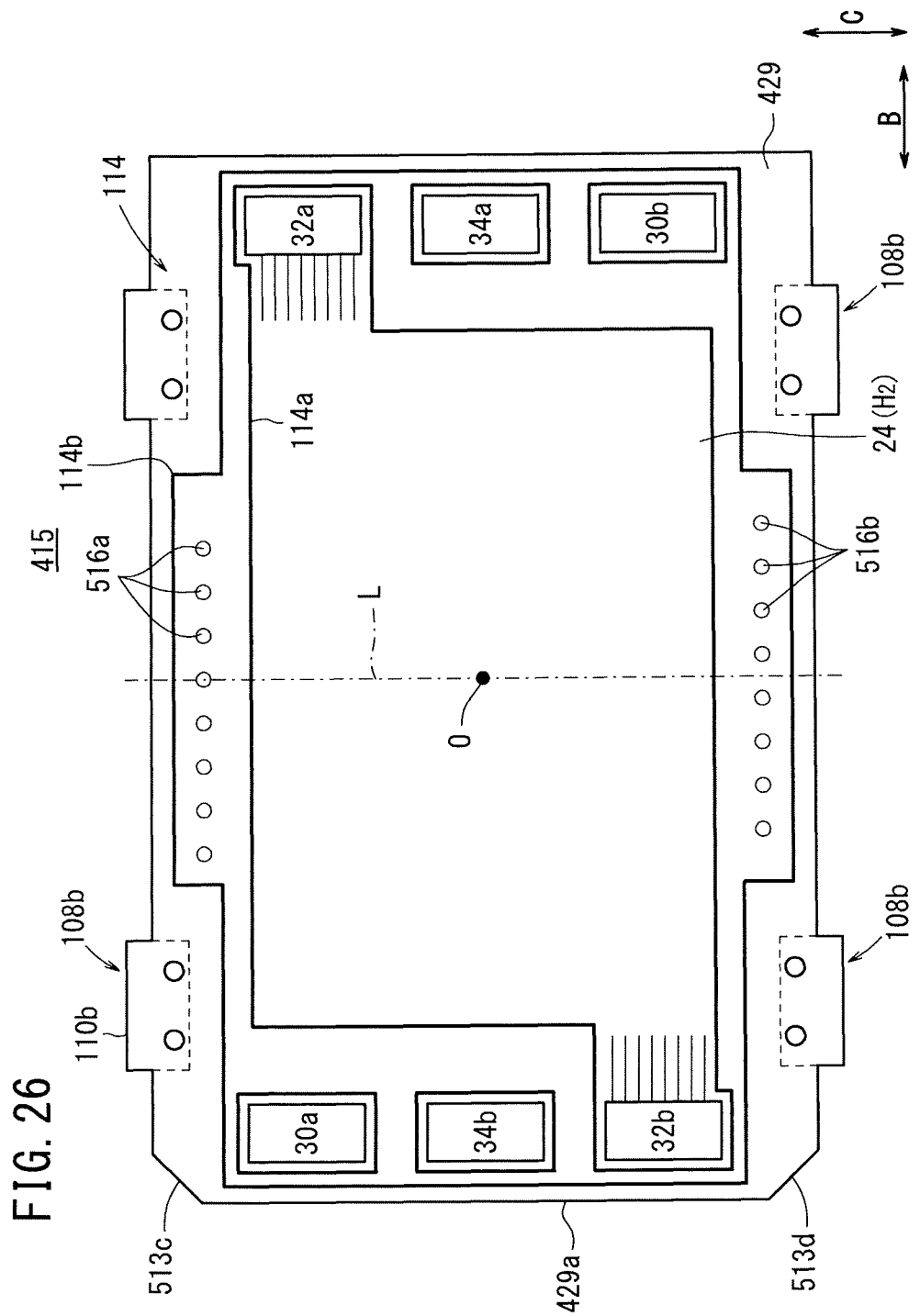
FIG. 26 is a front elevational view of a second membrane electrode assembly of the fuel cell of FIG. 19.
Figure 27:
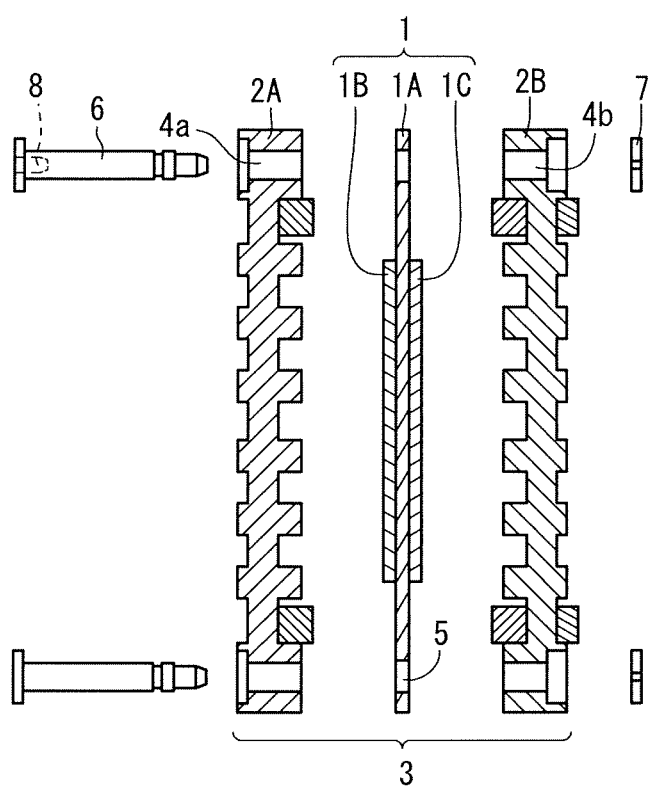
FIG. 27 is an exploded view of a fuel cell according to a prior art.

As shown in FIG. 26, in the second membrane electrode assembly 415, as viewed in a front view of FIG. 26, between the upper detouring portion of the second sealing part 114b and the first sealing part 114a, a plurality of the holes 516a are arranged as through holes at regular intervals in the arrow B direction. Also between the lower detouring portion of the second sealing part 114b and the first sealing part 114a, a plurality of the holes 516b are arranged as through holes at regular intervals in the arrow B direction.

In the second membrane electrode assembly 415, a centerline L of the long sides passes through an axis O perpendicular to the electrode surface of the second membrane electrode assembly 415. The centerline L passes through the center of one of the holes 516a on one long side and passes between the holes 516b on the other long side. More specifically, when the second membrane electrode assembly 415 is rotated 180° about the axis O, the post-rotation positions of the holes 516a on the one long side are located between the pre-rotation positions of the holes 516b on the other long side. In other words, the post-rotation positions of the holes 516a are shifted by half pitch from the pre-rotation positions of the holes 516b.

In the second membrane electrode assembly 415, cutouts (or projections or markers) (identification portions for rotational position detection) 513c and 513d are formed at both corners (or one corner) of one short side 429a of the frame portion 429, on which the oxygen-containing gas supply passage 30a, the coolant discharge passage 34b, and the fuel gas discharge passage 32b are formed.

In the fuel cell 410 of the third embodiment, as shown in FIG. 19, the fuel cell units 412A and 412B having the same structure are alternately stacked such that the fuel cell units 412B are rotated 180° about the axis O with respect to the fuel cell units 412A. Therefore, the fuel cell units 412A and 412B can have the same first separators 416, the same second separators 418, and the same third separators 420. As shown in FIG. 21, the flow phases of the first separator 416, the second separator 418, and the third separator 420 in the fuel cell unit 412A are opposite to those in the fuel cell unit 412B.

Thus, the first separators 416, second separators 418, and third separators 420 can be commonly used in the fuel cell units 412A and 412B, whereby the number of components can be advantageously reduced. Consequently, the number of the separators can be substantially reduced by half, whereby the production cost of the entire fuel cell 410 can be advantageously lowered.

When the first membrane electrode assembly 414 is rotated 180° about the axis O, the post-rotation positions of the resin pins 504a on the one long side are located between the pre-rotation positions of the resin pins 504b on the other long side. In other words, the post-rotation positions of the resin pins 504a are shifted by half pitch from the pre-rotation positions of the resin pins 504b.

Furthermore, when the first separator 416, the second membrane electrode assembly 415, the second separator 418, and the third separator 420 are rotated 180° about the axis O, the post-rotation positions of the holes 474a, 516a, 498a, and 448a on the one long side (into which the resin pins 504a are integrally inserted) are shifted by half pitch from the pre-rotation positions of the holes 474b, 516b, 498b, and 448b on the other long side.

Therefore, the resin pins 504a are not inserted into the holes 474b, 516b, 498b, and 448b, while the resin pins 504b are not inserted into the holes 474a, 516a, 498a, and 448a. Thus, wrong assembly of the first separator 416, the second separator 418, and the third separator 420 on the first membrane electrode assembly 414 and the second membrane electrode assembly 415 can be prevented as much as possible.

In addition, in the first membrane electrode assembly 414 and the second membrane electrode assembly 415, the cutouts 513a, 513b, 513c, and 513d are formed at both corners of the one short sides 428a and 429a of the frame portions 428 and 429. Therefore, when the fuel cell units 412A and 412B are stacked, it is only necessary to arrange the cutouts 513a, 513b and the cutouts 513c, 513d alternately in the arrow B direction.

Thus, the fuel cell units 412A and 412B can be stacked easily and efficiently without wrong assembly, whereby the assembling process of the fuel cell 410 can be drastically simplified advantageously.

The fuel cell units 412A and 412B are integrally retained by a plurality of the resin pins 504a and 504b on the long sides respectively. Therefore, with such a simple and economical structure, the fuel cell units 412A and 412B can be accurately positioned and retained.

Incidentally, though the cutouts 513a and 513b are used as the identification portions for rotational position detection in this embodiment, the identification portions for rotational position detection are not limited thereto. For example, as the identification portions for rotational position detection, a recess, an opening, a slit, etc. may be formed in a part of the frame portion 428. Alternatively, a part of the frame portion 428 may be subjected to a printing process, a coloring process, etc. in order to provide a function as the identification portions for rotational position detection Though the fuel cell units 12, 212A, 212B, 412A, and 412B each contain two MEAs and three separators in the first to third embodiments, the numbers of the components are not limited thereto. For example, each fuel cell unit may contain one MEA and two separators, three MEAs and four separators, or the like.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell unit formed by stacking a rectangular membrane electrode assembly and a rectangular metal separator together, the membrane electrode assembly comprising a pair of electrodes and an electrolyte membrane interposed between the electrodes, a picture-frame-like resin frame being formed on an outer circumference of the membrane electrode assembly, wherein:
    the membrane electrode assembly has a plurality of fastening members situated exclusively at central portions of opposite long sides of the picture-frame-like resin frame of the membrane electrode assembly,
    another component including the separator has holes into which the fastening members are inserted, the holes directly formed in central portions of opposite long sides of the separator,
    the fastening members are fitted into the inner circumferential surfaces of the holes with no gap therebetween,
    the membrane electrode assembly has a first sealing part thereon disposed proximate an outer edge of the resin frame and radially outside of the fastening members, and the membrane electrode assembly also has a second sealing part thereon disposed radially inwardly of the fastening members,
    the fastening members are proximate to and outside the second sealing part, and the separator extends outward beyond the second sealing part by a distance sufficient to accommodate the holes for receiving the fastening members outside of and adjacent to the second sealing part,
    and at least one membrane electrode assembly and at least two separators are integrated together.

2. The fuel cell unit according to claim 1, wherein the membrane electrode assembly and the separator have rebuilt pin insert holes on opposite long sides thereof, respectively.

3. The fuel cell unit according to claim 1, wherein the fastening member is a resin projection formed integrally with the picture-frame-like resin frame, and the resin projection is integrally inserted into the hole of the other component and subjected to a crimping process.

4. The fuel cell unit according to claim 1, wherein the fastening member is a resin projection formed integrally with the picture-frame-like resin frame, and the resin projection is integrally inserted into the hole of the other component and subjected to a heat-welding and crimping process.

5. A fuel cell formed by stacking a plurality of fuel cell units, the fuel cell units each formed by stacking a rectangular membrane electrode assembly and a rectangular metal separator together, the membrane electrode assembly comprising a pair of electrodes and an electrolyte membrane interposed between the electrodes, a picture-frame-like resin frame being formed on an outer circumference of the membrane electrode assembly,
    wherein:
    the separator has a plurality of holes directly formed in central portions of opposite long sides thereof,
    in each of the fuel cell units, the picture-frame-like resin frame has a plurality of fastening members situated exclusively at central portions of opposite long sides thereof, and the fuel cell unit is retained integrally by passing the fastening members through the holes of the separator,
    the membrane electrode assembly has a first sealing part thereon disposed proximate an outer edge of the resin frame and radially outside of the fastening members, and the membrane electrode assembly also has a second sealing part thereon disposed radially inwardly of the fastening members,
    the fastening members are proximate to and outside the second sealing part, and the separator extends outward beyond the second sealing part by a distance sufficient to accommodate the holes for receiving the fastening members outside of and adjacent to the second sealing part, and
    the fastening members of the fuel cell units adjacent to each other are not overlapped with each other in the stacking direction of the fuel cell units.

6. The fuel cell according to claim 5, wherein the fuel cell unit comprises a first membrane electrode assembly, a first separator, a second membrane electrode assembly, a second separator, and a third separator, which are stacked in this order and integrally retained by the fastening members.

7. The fuel cell according to claim 5, wherein the fastening member is a resin projection formed integrally with the picture-frame-like resin frame, and the resin projection is integrally inserted into a hole of another component and subjected to a crimping process.

8. The fuel cell according to claim 5, wherein the fastening member is a separate resin clip member, and
the resin clip member is integrally inserted into holes of the membrane electrode assembly and the separator.

9. The fuel cell according to claim 5, wherein the fastening member is a resin projection formed integrally with the picture-frame-like resin frame, and the resin projection is integrally inserted into a hole of another component including the separator and subjected to a heat-welding and crimping process.

10. The fuel cell according to claim 5, wherein the fuel cell unit further comprises an additional separator, and at least one membrane electrode assembly and at least two separators are integrated together by passing the fastening members through the holes of the separators.

11. A fuel cell formed by stacking a plurality of fuel cell units, the fuel cell units each formed by stacking a rectangular membrane electrode assembly and a rectangular metal separator together, the separator having a plurality of holes directly formed in central portions of opposite long sides thereof, the membrane electrode assembly comprising a pair of electrodes and an electrolyte membrane interposed between the electrodes, a picture-frame-like resin frame being formed on an outer circumference of the membrane electrode assembly, wherein:
the fuel cell units are stacked such that one of the adjacent fuel cell units is rotated 180° about an axis perpendicular to an electrode surface with respect to the other of the adjacent fuel cell units,
each of the fuel cell units has a plurality of fastening members situated exclusively at central portions of opposite long sides of the picture-frame-like resin frame of the membrane electrode assembly, the fastening members configured to pass through the holes formed in the separator, wherein the fuel cell unit is retained integrally,
the membrane electrode assembly has a first sealing part thereon disposed proximate an outer edge of the resin frame and radially outside of the fastening members, and the membrane electrode assembly also has a second sealing part thereon disposed radially inwardly of the fastening members,
the fastening members are proximate to and outside the second sealing part, and the separator extends outward beyond the second sealing part by a distance sufficient to accommodate the holes for receiving the fastening members outside of and adjacent to the second sealing part,
and when the fuel cell unit is rotated 180° about the axis, the post-rotation positions of the fastening members on one of the long sides are located between the pre-rotation positions of the fastening members on the other long side.

12. The fuel cell according to claim 11, wherein the fastening member is a resin projection formed integrally with the picture-frame-like resin frame, and
the resin projection is integrally inserted into a hole of another component and subjected to a crimping process.

13. The fuel cell according to claim 11, wherein the fuel cell units are stacked such that one of the adjacent fuel cell units is rotated 180° about the axis with respect to the other of the adjacent fuel cell units, and
the membrane electrode assembly has an identification portion for rotational position detection.

14. The fuel cell according to claim 11, wherein in the picture-frame-like resin frame, a fuel gas supply passage and a fuel gas discharge passage for flowing a fuel gas in the stacking direction of the fuel cell units are disposed symmetrically to each other, an oxygen-containing gas supply passage and an oxygen-containing gas discharge passage for flowing an oxygen-containing gas in the stacking direction are disposed symmetrically to each other, and a coolant supply passage and a coolant discharge passage for flowing a coolant in the stacking direction are disposed symmetrically to each other.

15. The fuel cell according to claim 11, wherein the fuel cell unit comprises a first membrane electrode assembly, a first separator, a second membrane electrode assembly, second separator, and a third separator, which are stacked in this order and integrally retained by the fastening members.

16. The fuel cell according to claim 11, wherein the fuel cell unit further comprises an additional separator, and at least one membrane electrode assembly and at least two separators are integrated together by passing the fastening members through the holes of the separators.

* * * * *